United States Patent [19]
Marui et al.

[11] Patent Number: 5,481,112
[45] Date of Patent: Jan. 2, 1996

[54] METHOD AND APPARATUS FOR PROCESS CONTROL OF MATERIAL EMITTING RADIATION

[75] Inventors: Tomohiro Marui, Fuchu; Kazuo Arai, Chiba, both of Japan

[73] Assignee: Kawasaki Steel Corporation, Hyogo, Japan

[21] Appl. No.: 296,168

[22] Filed: Aug. 29, 1994

Related U.S. Application Data

[63] Continuation of Ser. No. 988,844, Dec. 10, 1992, abandoned.

[30]     Foreign Application Priority Data

Dec. 13, 1991  [JP]  Japan ................................. 3-330958
Dec. 16, 1991  [JP]  Japan ................................. 3-352797

[51] Int. Cl.$^6$ ............................ G01N 21/35; G01J 5/10
[52] U.S. Cl. ..................... 250/339.14; 250/338.1; 250/339.01; 250/340; 250/359.1; 374/9
[58] Field of Search ................... 250/526, 493.1, 250/341, 338.1, 341.6, 340, 359.1, 341.3, 341.4, 339.01, 339.03, 339.04, 339.14; 374/9, 121, 126, 128, 129, 204

[56]            References Cited

U.S. PATENT DOCUMENTS

| | | | |
|---|---|---|---|
| 4,498,765 | 2/1985 | Hervé .............................. | 374/126 X |
| 4,659,234 | 4/1987 | Brouwer et al. ................... | 250/340 |
| 4,881,823 | 11/1989 | Tanaka et al. ..................... | 374/9 |
| 5,166,080 | 11/1992 | Schietinger et al. .................. | 437/7 |
| 5,249,142 | 9/1993 | Shirakawa et al. ............. | 250/339.04 X |
| 5,314,249 | 5/1994 | Marui et al. ..................... | 374/128 |

FOREIGN PATENT DOCUMENTS

| | | |
|---|---|---|
| 0169664 | 1/1986 | European Pat. Off. . |
| 2015389 | 4/1970 | France . |
| 3-4855 | 1/1991 | Japan . |
| 91/19025 | 12/1991 | WIPO . |

OTHER PUBLICATIONS

Thorpe, et al., "In Situ Growth Rate Measurements During Molecular Beam Epitaxy Using an Optical Pyrometer" ; Applied Physics Letters, vol. 55, No. 20, pp. 2138–2140, Nov. 1989.

F. Roozeboom, "Temperature Control and System Design Aspects in Rapid Thermal Processing"; Rapid Thermal and Integrated Processing Symposium, pp. 9–16, May 1991.

L. D. Zekovic, "Investigation of Anodic Alumina by a Photoluminescence Method: II"; Thin Solid Films, vol. 109, No. 3, pp. 217–223, Nov. 1983.

60.14108 . JP Abstract Jan. 24, 1985.

Tanaka et al., "Theory of a New Radiation Thermometry Method and a n Experimental Study Using Galvannealed Steel Specimens"; Trans. of the Soc. of Instrument and Control Engineers, vol. 25, No. 10, 1031/1037, Oct. 1989); pp. 1–7.

Makino, "Present Research on Thermal Radiation Properties and Characteristics of Materials"; International Journal of Thermophysics, vol. 11, No. 2, 1990; pp. 339–352.

Makino et al.; "Thermal Radiation Characteristics of Stainless Steels and Super-Alloys in an Oxidation Process at High Temperatures"; The Second Asian Thermophysical (List continued on next page.)

Primary Examiner—Carolyn E. Fields
Assistant Examiner—Edward J. Glick
Attorney, Agent, or Firm—Oliff & Berridge

[57]            ABSTRACT

A method and apparatus are disclosed for controlling a physical property such as deposited film thickness to a desired value of control in a high temperature process using a desired emissivity power ratio and an emissivity power ratio measured from detected radiation energy. The measured emissivity power ratio is obtained on-line from detection signals of radiation sensors. A desired value of control is converted to the desired emissivity power ratio using predetermined relationships established by theory or experiment. The desired emissivity power ratio and the measured emissivity power ratio are compared to achieve the desired value of control.

13 Claims, 35 Drawing Sheets

OTHER PUBLICATIONS

Properties Conference, 1989; pp. 221–226.

Tanaka et al.; "Application of Trace Method: A New Method for the Simultaneous Determination of Temperature and Two Spectral Emissivities"; UDC 536,521: 669. 14–415; pp. 63–67, (1990).

Watanabe et al.; "Radiation Thermometry of Silicon–Wafer in Semiconductor Heat–Treatment Equipment"; vol. 25, No. 9, 925/931 (1989); pp. 1–6.

Schiroky; "In Situ Measurement of Silicon Oxidation Kinetics by Monitoring Spectrally Emitted Radiation"; Joun. of Materials Science 22 (1987) pp. 3595–3601.

Colavito et al.; "Effects of External Silicon Dioxide and Surface Roughness on the Radiative Melting of Silicon"; J. Electrochem. Soc., vol. 134, No. 5, May 1987; pp. 1211–1220.

FIG. 37
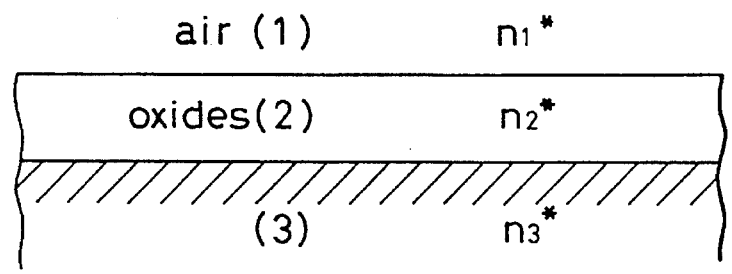
FIG. 38
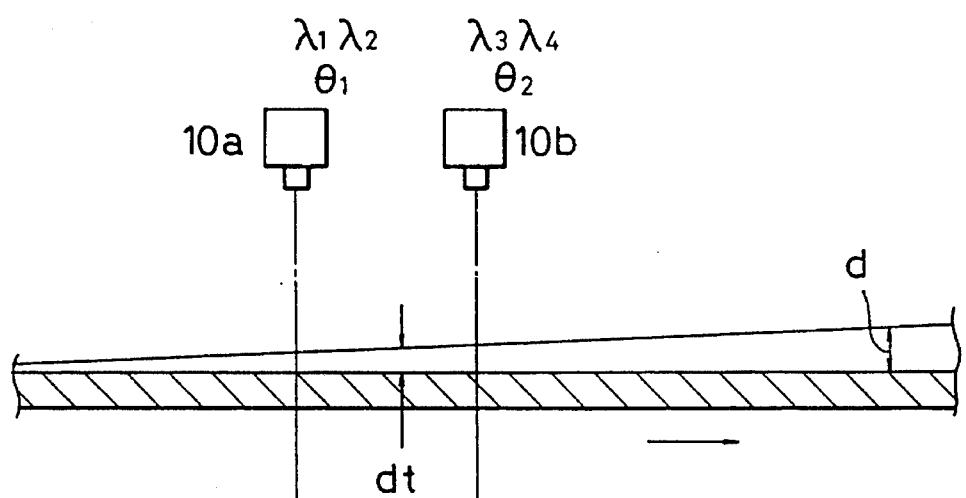
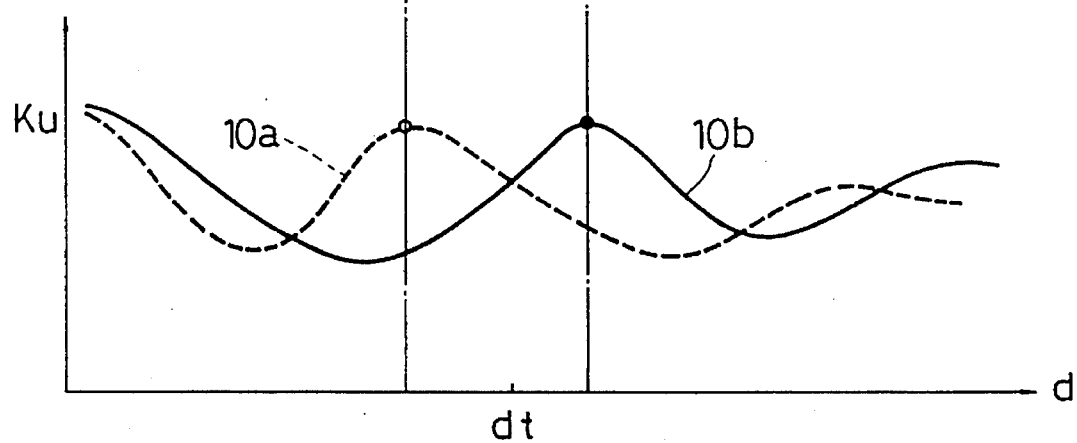

METHOD AND APPARATUS FOR PROCESS CONTROL OF MATERIAL EMITTING RADIATION

This is a Continuation of application Ser. No. 07/988, 844, filed Dec. 10, 1992, now abandoned.

BACKGROUND OF THE INVENTION

1. Field of the Invention

The present invention relates to process control of a material on which a change in surface property occurs during such a process as thin film formation on a semiconductor, annealing of stainless steel plates, and galvannealing to thereby vary the emissivity of the surface.

2. Description of the Prior Art

In various material processing (such as thin film forming process on a semiconductor, annealing process of a stainless steel plate, and galvannealing process), the material temperature serves as an important parameter for satisfactory control of the process. As a technique to measure the material temperature in a non-contact manner, there is proposed radiation thermometry. In the radiation thermometry technique, the emissivity varies on account of changes in the physical properties such as oxidization and galvannealing on the materials surface and thermometric errors are produced as a result of the variation in the emissivity. Therefore, attempts have been made to correct for the variation in the emissivity to obtain a real temperature. As one of such techniques, there is two-color thermometry which performs radiation thermometry using two wavelengths.

In the two-color thermometry technique, the temperature measurement can be achieved fairly well when spectral emissivities for two wavelengths in use are virtually equal or have certain proportionality therebetween. However, when the surface condition of a hot matter suddenly changes due to oxidation occurring thereon, the spectral emissivities deviate from the aforesaid relationship and, the measurement accuracy extremely decreases. Much greater error is produced when a single-color radiation thermometer is used.

As techniques to overcome the above problems, there are proposed:

(a) a method disclosed in Japanese Patent Publication No. 3-4855;

(b) a TRACE (Thermometry Re-established by Automatic Compensation of Emissivity) method disclosed in Tanaka and D. P. Dewitt: "Theory of a New Radiation Thermometry Method and an Experimental Study Using Galvannealed Steel Specimens", The Transactions of the Japanese Institute of Measurement and Automatic Control Engineers, Vol. 25, No. 10, pp. 1031–1037 (October 1989).

Since both the above methods are basically the same, the former will be described below.

The spectral emissivity for radiation energy (light wave) emitted from a material in process is obtained by using Wien's approximation law. When wavelengths are $\lambda_1$ and $\lambda_2$, the emissivities are given by the following expressions (1) and (2). By eliminating temperature T from these expressions, expression (3) can be obtained.

$$\epsilon_1 = \exp\{C_2/\lambda_1(1/T - 1/S_1)\} \quad (1)$$

$$\epsilon_2 = \exp\{C_2/\lambda_2(1/T - 1/S_2)\} \quad (2)$$

$$\epsilon_1^{\lambda_1}/\epsilon_2^{\lambda_2} = \exp\{C_2(1/S_2 - 1/S_1)\} \quad (3)$$

where $\lambda_i$: measurement wavelength [μm]

$\epsilon_i$: spectral emissivity for a measurement wavelength $\lambda_i$ [μm]

T: real temperature of the hot material surface [K]

Si: brightness temperature of the hot material surface at a wavelength $\lambda_i$ [K]

C2: (Planck's) second radiation constant, $1.4388 \times 10^4$ [μm·K]

The left side of the expression (3) is the ratio between "the wavelength power of spectral emissivities", which, will hereinafter be called "emissivity power ratio" for simplicity. The old two-color radiation thermometer is such that measures temperature on the assumption that the ratio between spectral emissivities ($\epsilon_1/\epsilon_2$) is "1" or a constant, and because it does not respond to changes in the spectral emissivities, it produces a great measurement error.

Now, in Japanese Patent Publication No. 3-4855, the correlation function "f" of the emissivity power ratio to the spectral emissivity ratio ($\epsilon_1/\epsilon_2$) as shown in the following expression (4), is determined in advance by measurement. In the temperature measurement, the spectral emissivity ratio is obtained from the emissivity power ratio calculated according to the above expression (3) by using the correlation function f, and the temperature T is obtained by calculation according to the following expression (5).

$$\epsilon_1/\epsilon_2 = f(\epsilon_1^{\lambda_1}/\epsilon_2^{\lambda_2}) \quad (4)$$

$$T = (\lambda_2 - \lambda_1)/\{\lambda_1\lambda_2/C_2 \cdot \ln(\epsilon_1/\epsilon_2) + (\lambda_2/S_1) - (\lambda_1/S_2)\} \quad (5)$$

In the measurement method using the above expressions, when it is applied to thermometry of a hot matter whose surface condition changes with the progress of oxidation reaction or the like, highly accurate temperature measurement can be attained provided that the measurement wavelengths that are selected are "insensitive" to changes of the surface status. However, when the emissivity power ratio of the selected wavelengths are sensitive to the change in the surface condition, the measurement accuracy greatly decreases as described below in detail.

As a concrete example where the spectral emissivities of selected wavelengths sensitively change responding to changes in the surface status of a hot matter, there is the case where the surface is oxidized and a translucent (at the measurement wavelength) oxide film is formed on the surface. In such a case, optical interference takes place in the translucent film formed on the surface and the spectral emissivity is thereby greatly reduced. In such case, the emissivity power ratio also greatly changes.

On such a phenomenon of sudden change of emissivity, Makino et al. give account in "Heat Transfer 1986", Vol. 2, Hemisphere (1986) pp. 577–582, on the basis of experiments and model calculation based on optical interference theories, that a drop (hereinafter called "valley") appears in the spectral emissivity spectrum at a short-wavelength zone when surface oxidation occurs and the valley is confirmed to move toward the longer-wavelength side as the oxidation progresses.

FIG. 1 to FIG. 5 are diagrams schematically showing an example of such a characteristic change in a spectral emissivity spectrum.

Referring to the diagrams, the axis of abscissas represents the spectral wavelength λ and the axis of ordinates represents the emissivity ε and, further, the portion indicated by "valley" is a drop in the spectral emissivity spectrum.

FIG. 1 to FIG. 5 show changes in the spectral emissivity spectrum of the surface as an oxide film is progressively formed on a surface of such metal as stainless steel.

FIG. 1 shows an emissivity spectrum of the metal surface in a low temperature state where no oxide film is formed. FIG. 2 shows an intermediate temperature state where an oxide film is not yet formed. FIG. 3 shows an intermediate temperature state where an oxide film has started to formed. FIG. 4 shows a state of the same temperature and having the oxide film growing thereon. FIG. 5 shows a state of a high temperature and having a thick oxide film formed thereon.

The occurrence of the valley is considered chiefly due to optical interference caused by an oxide film. Makino et al. obtained spectral emissivity spectra through model calculation based on interference theories and report that results of the calculation and experimental results concur well with each other.

Accordingly, the phenomenon of the change in the spectral emissivity spectrum can be considered to occur because radiation energy of a spectral wavelength band on the order below the thickness of the oxide film is selectively trapped in the oxide film. More specifically, interference or multiple reflection in the oxide film causes remarkable energy attenuation in a uniquely selected radiation and the valley moves from short wavelength side to long wavelength side because the uniquely selected wavelength band moves as the oxide film becomes thicker.

Since the emissivity ratios change as the spectral emissivity spectra change with the passage of time as described above, it is natural that measurement errors are produced in the old type two-color radiation thermometer and measurement errors are equally produced even in the above described improved type two-color thermometer according to Japanese Patent Publication No. 3-4855 because of difficulty in calculating expressions used therein.

The reason is, while the calculation in the improved type two-color thermometer using near-by two wavelengths $\lambda_1$ and $\lambda_{1x}$ requires that a correlation between the two spectral emissivities $\epsilon_1$ and a $\epsilon_{1x}$ is determined as a regression function in advance from experimental data on an off-line basis, the regression procedure is subject to error. This will be briefly described below.

Supposing that actually measured data of spectral emissivities $\epsilon_1$ and $\epsilon_{1x}$ are those obtained while the movement of the valley from short wavelength side to long wavelength side is taking place as in the spectral emissivity spectrum described above, the correlation of the emissivity $\epsilon_1$ and the $\epsilon_{1x}$ changes as "positive correlation"→"negative correlation"→"positive correlation".

This will be understood easily if the changes in the values of the emissivities $\epsilon_1$ and $\epsilon_{1x}$ corresponding to the near-by two wavelengths $\lambda_1$ and $\lambda_{1x}$ in FIG. 1 to FIG. 5 are traced. More specifically, when the low wavelength portion of the "valley" in the diagrams (the portion where the spectral gradient is negative) comes between the wavelengths $\lambda_1$ and $\lambda_{1x}$, the relative magnitude between the spectral emissivities $\epsilon_1$ and $\epsilon_{1x}$ is reversed and positiveness and negativeness of the correlation are reversed.

The situation will be concretely shown in FIG. 6 and FIG. 7. The correlation before passing the valley (FIG. 6) and that after passing the valley (FIG. 7) are obviously completely reverse.

In Tanaka et al., "Seitetsu Kenkyu (in Japanese)", No. 339 (1990) PP. 63–67, it is shown that the $\epsilon_1$–$\epsilon_2$ correlation graph is not one-valued, but there is formed a loop, as schematically shown in FIG. 8. This loop is supposed to be also due to radiation interference occurring in the oxide film.

Thus, there is a problem that occurrence of some measurement error is unavoidable even in the improved type two-color thermometer because, as described above, the correlative regression graph between the emissivities $\epsilon_1$ and $\epsilon_{1x}$ cannot be simply determined.

When temperatures of stainless steel plate (SUS 430) with surface oxidation in progress thereon were measured with the above described improved type two-color thermometer, the maximum measurement error in the temperature range around 600° C. was 15° C. or so in its maximum and the standard deviation was 5° C. or so.

As described above in detail, a radiation thermometer cannot accurately measure the surface temperature of a material in process on an on-line basis when the surface status of the material changes with the passage of time accompanied by a variation in the emissivity as in the case where a steel plate is continuously processed. Hence, there is a difficulty that the thickness of the oxide film cannot be controlled with high accuracy even if the heating temperature such as the furnace temperature or the manipulated variable such as the line speed is controlled with the surface temperature of the material in process used as an indirect controlled variable.

Even if it is assumed that the surface temperature could be accurately measured, the thickness of the oxide film does not necessarily accurately correspond to the temperature. Again, there is a difficulty that it is not ensured that the thickness of the oxide film will be controlled to a desired value when the measured temperature is used as the controlled variable.

Such a difficulty as above is also encountered when a surface property such as the galvannealing degree is controlled in a continuous process of galvanized sheet steel.

Further, since the above described method is that for measuring temperature, it is only applicable to control of temperature and not applicable to other various kinds of process control. While the ultimate control target in an actual process is the property of material (physical property), shape of material (film thickness), or the like, temperature is only an agent supporting the progress of the process. In reality, a reaction acceleration indirectly caused by temperature is controlled in the prior art. Therefore, a control system using the temperature as the controlled variable is wasteful in controlling such a factor as the property of material (physical property) and shape of material (film thickness) and it poses a problem when structuring a control system. A desired value as a film thickness, or a material status value should be used as the controlled variable. An example for this problem will be shown below.

In a silicon semiconductor surface process (LSI process), a silicon oxide film controlled to high accuracy (of the $10^{-1}$–$10^{-2}$ μm) is formed on the silicon surface. Generally, the time variation of the formed film thickness d under a constant temperature is measured off-line, and in the actual process, the temperature and the reaction time are automatically controlled. With the increased degree of refining in the process being required, the accuracy of film thickness control becomes severer, and it is presumed that the process time and heat pattern requirements will become even more severe. In concrete terms, quick heating and short-time processing will be required such as in RTP (Rapid Thermal Process). In such a process, the above described temperature measurement on the basis of off-line data has its limitations. More specifically, an oxide film is produced when a material is heated under a constant temperature and the change in the film thickness causes a problem.

The fundamental problem here is that indirect control with "temperature" is being performed while the target of process control is "thin film thickness". Accordingly, after the processing, there are produced statistical process errors of film thickness. Since it is very difficult to directly measure the film thickness, it is frequently questioned whether there is any better variable for indirect control.

More specifically, it is ideal if the "thin film thickness" as the target of process control is directly measured, but it is very difficult to directly measure the film thickness on-line. A known art of an optical measurement technique such as ellipsocollimation utilizing polarized light is not applicable to the process under high temperature. Because of such difficulties, the yield rate of products going through the LSI total process is very low. As the main cause of such situation, the above described difficulty in the thin film formation process control has come to be recognized, and there have been great demands for a thorough solution of the problem.

SUMMARY OF THE INVENTION

The present invention has been made to overcome the above described difficulties in the prior art. Accordingly, an object of the present invention is to provide a method and apparatus for controlling a process which, in continuously processing a material to be processed, can control a physical property such as formation of a thin film thickness of oxide film or the like or the degree of surface galvannealing or the like with high accuracy by means of radiation and can greatly improve the quality of the material gone through the continuous processing.

In order to solve the above problem, a method for controlling a process according to the present invention, in which the material in process emits radiation energy, is characterized in that it comprises the steps of detecting the radiation energy for a plurality of different wavelengths or different measurement angles or different polarization filtering angles, obtaining a measured value of the emissivity power ratio from the radiation energy for the plurality of wavelengths, providing, by conversion in accordance with a predetermined correlation between a real control target and an emissivity power ratio target, an indirect desired value of the emissivity power ratio corresponding to the direct desired value, and automatically controlling the processing of the material in process using the indirect desired value as the target and the measured (and calculated) value of $\epsilon_1^{\lambda 1} \epsilon_2^{\lambda 2}$ as the controlled variable.

The method may also be characterized by that, in providing by conversion the indirect controlled variable, a history from the initial value to the final value of the indirect desired value is output and the processing of the material in process is automatically controlled following the course of the history of the indirect desired value and the measured value as the controlled variable.

The method may also be characterized by that the detected radiation energy for the plurality of wavelengths or angles is detected with different wavelengths or angles, measured values of a plurality of emissivity power ratios obtainable from the radiation energy for the plurality of wavelengths or angles are obtained, and the processing of the material in process is automatically controlled using said history of indirect desired emissivity power ratio $\epsilon_1^{\lambda 1}/\epsilon_x^{\lambda 2}$ value and said measured emissivity power ratio $\epsilon_1^{\lambda 1}/\epsilon_2^{\lambda 2}$ value as controlled variable.

The method may also be characterized by that the detected radiation energy for the plurality of wavelengths or angles is detected with a combination of three or more kinds of different wavelengths or angles, measured values of a plurality of emissivity power ratios obtainable from said radiation energy for the plurality of wavelengths or angles are obtained, and the processing of said material in process is automatically controlled through comparison of the measured values.

As shown in FIG. 12, an apparatus for controlling a process according to the present invention is that in which a material in process emits radiation energy and characterized in that it comprises a desired value conversion block for providing, by conversion in accordance with a predetermined correlation between a direct controlled variable and an emissivity power ratio target, an indirect desired value of the emissivity power ratio corresponding to the direct desired value, at least one radiation sensor for detecting the radiation energy with a plurality of different wavelengths or angles to thereby output the detected radiation energy as radiation energy signals for the plurality of wavelengths or angles, and an emissivity power ratio calculation block for obtaining a measured value of the emissivity power ratio from the radiation energy signals for the plurality of wavelengths, in which the processing of the material in process is automatically controlled with the indirect desired value used as a target and the measured value of the emissivity power ratio used as the controlled variable.

The apparatus for controlling a process may also be so that the desired value conversion block the history from the initial value to the final value of the indirect desired value and the processing of the material in process is automatically controlled following the course of the history.

The apparatus for controlling a process may also be so that the radiation sensor detects the detected radiation energy with different wavelengths, with different measurement angles, or with a combination of three or more kinds of the wavelengths or angles, and the emissivity power ratio calculation block obtains a plurality of measured values of the emissivity power ratio obtainable from the detected radiation energy for the plurality of wavelengths or angles and compares the measured values with each other to thereby automatically control the processing of the material in process.

In the method for controlling a process according to the present invention, radiation energy from a material in process is detected with a plurality of different wavelengths (for example $\lambda_i$ and $\lambda_j$) or different measurement angles or different polarization filtering angles and a measured value of an emissivity power ratio ([the $\lambda_i$ power of $\epsilon_i$]/[the $\lambda_j$ power of $\epsilon_j$], where $\epsilon_i$ and $\epsilon_j$ are emissivities of the material in process for the wavelengths $\lambda_i$ and $\lambda_j$) is obtained from the detected radiation energy for the plurality of wavelengths or angles. The emissivity power ratio exhibits a specific change depending on the temperature of the material in process and also exhibits corresponding changes depending on such conditions in the vicinity of the surface of the material in process as surface oxide film thickness, degree of galvannealing, crystal grain size, and roughness. Such value is taken as a direct desired value and a correlation of the direct desired value and the emissivity power ratio is predetermined by experiments or theories. By reference to the correlation and the above described measured value, the indirect desired value for process control corresponding to the measured value is obtained. As the desired value for setting, it is not necessarily needed to use the above described direct desired value itself but an indirect desired value can be used. Thus, a control system for executing automatic control is structured with the above described real control target with the indirect desired value as used established as the direct desired value and the measured value established as the controlled variable.

When automatic control is executed following the course of the history output from the desired value conversion block, the automatic control action is taken by tracing the history of the indirect target from its initial value to its final value. Hence, especially when the desired value correlation function to the emissivity power ratio is not a one-value function, erroneous automatic control is prevented from being made.

When a processing of a material is automatically controlled through comparison of measured values of a plurality of measured emissivity power ratios, automatic control can be achieved by monitoring values. Hence, especially when the correlations between the direct desired value and the emissivity power ratio are not a one-value function, such a merit is obtained that the fact that one of the values is taking up an extreme value can be detected so that erroneous automatic control is prevented from being made.

In the process control apparatus of the present invention, a radiation sensor detects radiation energy with a plurality of different wavelengths or angles and output it as radiation energy signals for the plurality of wavelengths or angles. The emissivity power ratio calculation block obtains the measured value of the emissivity power ratio from the radiation energy signals. On the other hand, the desired value conversion block derives the indirect desired value of the emissivity power ratio corresponding to the direct desired value. Thus, a control system executing automatic control is structured with the direct desired value, through the use of the indirect desired value, established as the direct desired value and the measured value established as the controlled variable. The above method for process control is realized in the apparatus for controlling a process of the present invention.

According to the present invention as described above, the real control target such as temperature, surface oxide film thickness, galvannealing degree, crystal grain size, and roughness is obtained from the emissivity power ratio as the indirect controlled variable, using the correlation between direct and indirect controlled variable and a control system is structured with the direct desired value, through the use of the indirect desired value as target, and the measured value as the controlled variable. Accordingly, a parameter can be used as the control target, which has hitherto been impossible, and control equivalent to direct control becomes possible and the controllability is greatly improved.

Further, in the cases where automatic control is executed following the course of the history output from the desired value conversion block or where the processing of a material in process is automatically controlled by comparing the measured values of a plurality of the emissivity power ratios, erroneous automatic control is prevented from being made and the controllability can further be improved.

According to another aspect of the present invention, there is provided an apparatus for controlling a process which uses radiation thermometers as the radiation sensor and comprises, to achieve the above mentioned object, a plurality of radiation thermometers arranged along a continuous process line for continuously processing the material in process which emits radiation energy, emissivity power ratio calculation means for calculating an emissivity power ratio using brightness temperatures $S_i$ and $S_j$ measured in each of the radiation thermometers with different wavelengths or angles on-line, data storage means for storing correlation data between a direct controlled variable, such as a film thickness or a physical property, and an emissivity power ratio produced off-line on the basis of measured data, theories, or approximation derived from theories, desired value conversion means using the correlation data for obtaining an indirect desired value of the emissivity power ratio corresponding to a direct desired value for each of the radiation thermometers, error calculation means for calculating the error between the measured value of the emissivity power ratio and the indirect desired value for each of the radiation thermometers, and control means for outputting a manipulated variable corrected in accordance with the error between the measured value of the emissivity power ratio and the indirect desired value.

The present invention also achieves the above mentioned object by arrangements, in the above apparatus for controlling a process, such that the radiation thermometers are different in at least either of measurement wavelengths and angles and measure the same measurement point of the material in process in different measurement positions.

The present invention also achieves the above mentioned object by arrangements, in the above apparatus for controlling a process, such that each of the radiation thermometers has the measurement wavelength and measurement angle and polarization filtering angle set up therein with which the thermometers can detect the measured emissivity power ratio corresponding to the direct controlled variable of the material in process arrived at its measurement position.

The present invention also achieves the above mentioned object by arrangements, in the above apparatus for controlling a process, such that the emissivity power ratio corresponding to the indirect desired value is an extreme value in a variation of the real controlled variable.

The present invention also achieves the above mentioned object by arrangements, in the above apparatus for controlling a process, such that the measurement wavelength and angle are set up such that the differential coefficient of the emissivity power ratio with respect to a variation of the direct controlled variable becomes great in the vicinity of the emissivity power ratio corresponding to the target of the direct desired value.

The present inventors, as the results of various investigations made on process control in a continuous process line, found, from the fact that variation of film thickness and the like can be directly recognized by positively utilizing the measured emissivity power ratio varying with the growth of the oxide film and the like as described above, that the oxide film thickness and the like can be controlled with high accuracy by utilizing the relationship between the measured emissivity power ratio obtained by measurement using the radiation thermometer and the oxide film thickness and the like.

The present invention has been made on the basis of the above finding and it is arranged therein such that correlation data between the direct controlled variable such as film thickness, physical property, and the like and the emissivity power ratio is obtained in advance from measurement data obtained off-line, theories, and the like, the difference (error) between the indirect desired value of the emissivity power ratio corresponding to the direct desired value, which is obtained according to the correlation data for each radiation thermometer, and the measured value of the emissivity power ratio is obtained, and the manipulated variable corrected in accordance with the difference (error) is output. Accordingly, it has become possible to utilize the emissivity power ratio as the controlled variable to thereby control the direct controlled variable to attain the desired value with high accuracy.

The principle of the controlling, in the case where the direct controlled variable is the oxide film thickness d, of the oxide film using the correlation between the direct controlled variable and the emissivity power ratio and using the emissivity power ratio as the controlled variable will be described below.

FIG. 9 is a diagram schematically showing the correlation between the emissivity power ratio Ku and the oxide film thickness d.

When d=0, the emissivity power ratio Ku is determined only by the emissivity of the base material of the processed material and, when d=∞, the same is determined only by the emissivity of the oxide (indicated by broken line in the diagram). As the oxide film grows and the film thickness d increases, the emissivity power ratio Ku varies taking the form of a wave as shown in the diagram on account of optical interference at the interface.

The form of the wave of the graph showing the correlation between the emissivity power ratio Ku and the oxide film thickness d has a tendency to exhibit an increase in the period of the graph when the wavelength used for measurement is shortened as shown in FIG. 10 and to exhibit shifting of its phase in the direction of increasing d(+) as the measurement angle θ (the angle formed with a normal to the material in process) as shown in FIG. 11.

Since various variational patterns are obtained between the emissivity power ratio Ku and the oxide film thickness d by changing the measurement wavelength λ and the measurement angle θ as described above, it becomes possible to make a measured value of the emissivity power ratio Ku (measured emissivity power ratio) and an oxide film thickness d at the measurement point corresponding to each other. Therefore, it can be achieved to determine whether or not an oxide film thickness d measured at a measurement point has attained its target by obtaining the measured value of the emissivity power ratio Ku.

Accordingly, by previously obtaining correlation data between the emissivity power ratio Ku and the oxide film thickness d off-line for each of used measurement wavelengths $\lambda_i$ and $\lambda_j$ and measurement angle θ on the basis of measured data, theories, and the like, and by comparing the indirect desired value of the emissivity power ratio corresponding to the direct desired value obtainable from the correlation data and measured emissivity power ratio and correcting the manipulated variable such as the line speed or the heating temperature according to the difference therebetween, it becomes possible to control the direct desired value precisely to attain the target value.

In the correlation graph between the emissivity power ratio Ku and the oxide film thickness d, the first maximal value is relatively large as shown in FIG. 9. Hence, this value is convenient for use as a reference for the control.

Accordingly, by setting up, in the radiation thermometer used for the measurement, such measurement conditions, i.e., the measurement wavelengths $\lambda_i$ and $\lambda_j$ and the measurement angle θ, that allow the first maximal value of the emissivity power ratio to appear as the direct desired value, a merit is obtained that the direct desired value can be easily recognized.

As described above, the indirect desired value of the emissivity power ratio corresponding to the target film thickness (direct desired value) can be easily derived by producing in advance the correlation data between the emissivity power ratio Ku and the oxide film thickness d for various measurement conditions. Hence, by comparing the control target of the emissivity power ratio and the emissivity power ratio obtained by actual measurement to obtain the difference (error) therebetween and correcting the line speed, heating temperature, or the like according to the difference (error), it becomes possible to precisely control the oxide film thickness to attain its target.

As the direct controlled variables for which correlation data with the emissivity power ratio can be produced other than the above described oxide film thickness, thickness of thin films such as a nitride film or a physical property such as the galvannealing degree of galvanized sheet steel can be mentioned.

According to the present invention, the controlling accuracy of the direct controlled variable, i.e., the thin film thickness of an oxide film or the like or a physical value such as the surface galvannealing degree, can be much improved and the quality of the processed material produced through continuous processing can be greatly improved by using the emissivity power ratio as the indirect controlled variable in the continuous processing of a material to be processed.

BRIEF DESCRIPTION OF THE DRAWINGS

The preferred embodiments will be described with reference to the drawings, wherein like elements have been denoted throughout the figures with like reference numerals, and wherein:

FIG. 37 is an explanatory diagram schematically showing a sectional view around the vicinity of a metal surface of carbon steel;

FIG. 38 is an explanatory diagram showing an arrangement of radiation thermometers with respect to a processed material and a manner for controlling oxide film thickness d;

DESCRIPTION OF THE PREFERRED EMBODIMENTS

Figure 1:
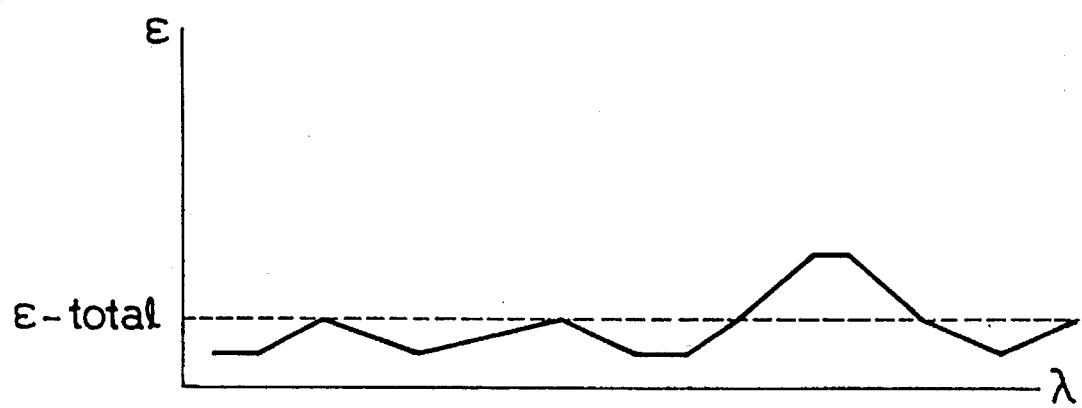
FIG. 1 is a diagram showing an emissivity spectrum of a low-temperature surface with no oxide film formed thereon for explaining a problem in the prior art.
Figure 2:
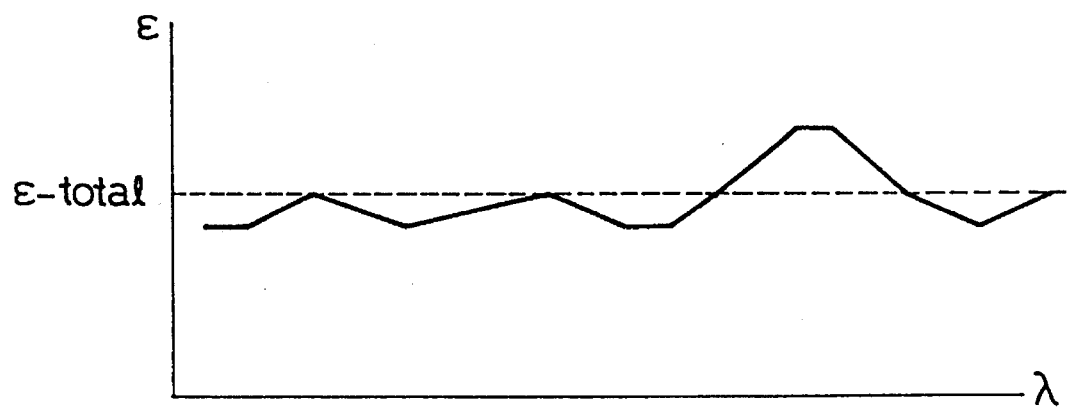
FIG. 2 is a diagram showing an emissivity spectrum of a medium-temperature surface with no oxide film formed thereon.
Figure 3:
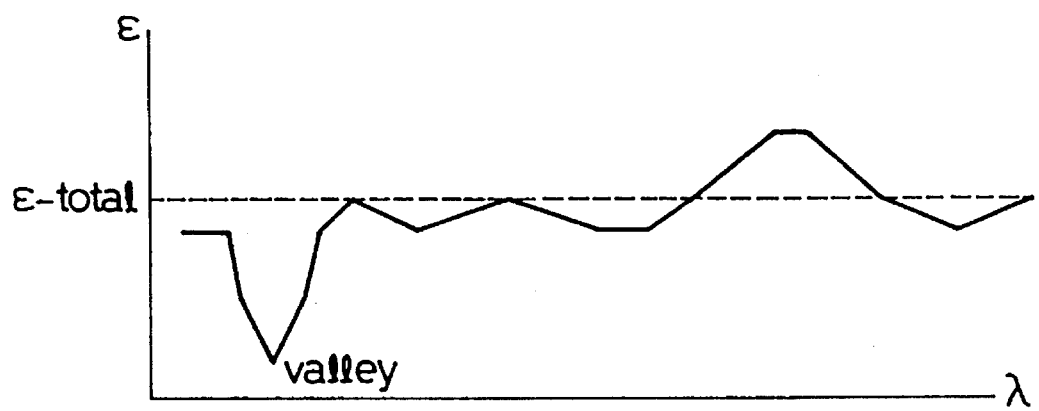
FIG. 3 is a diagram showing an emissivity spectrum of a surface with an oxide film just begin to form thereon.
Figure 4:
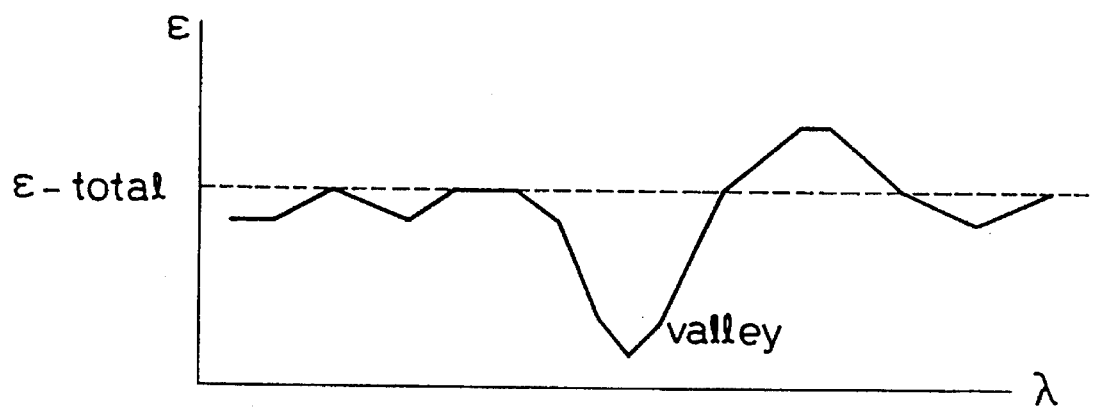
FIG. 4 is a diagram showing an emissivity spectrum of a surface with an oxide film growing thereon.
Figure 5:
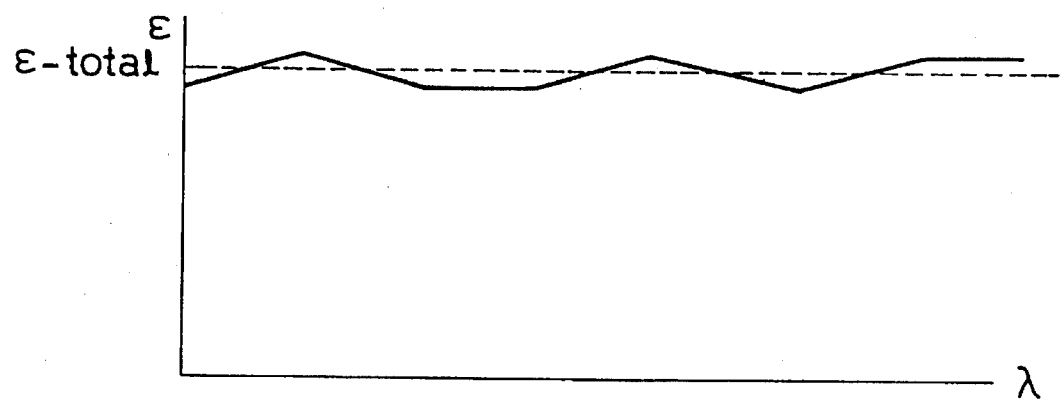
FIG. 5 is a diagram showing an emissivity spectrum of a surface after an inert oxide film has been formed thereon.
Figure 6:
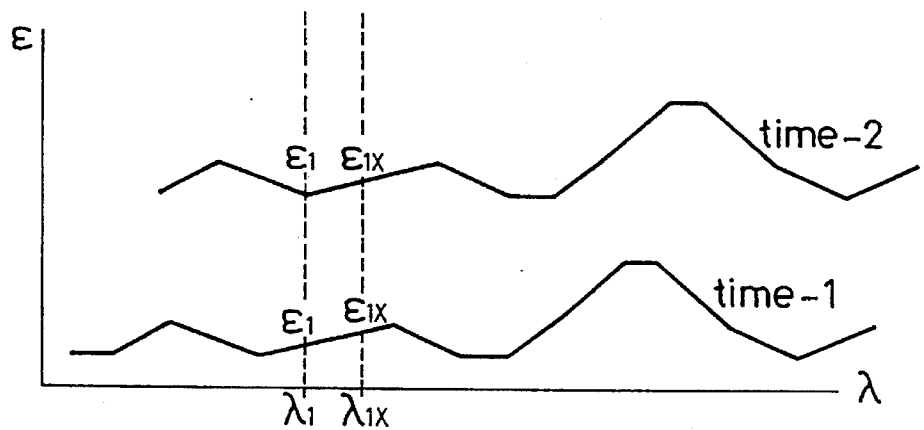
FIG. 6 is a diagram showing emissivity spectrums for nearby two wavelengths of a surface with no oxide film formed thereon.
Figure 7:
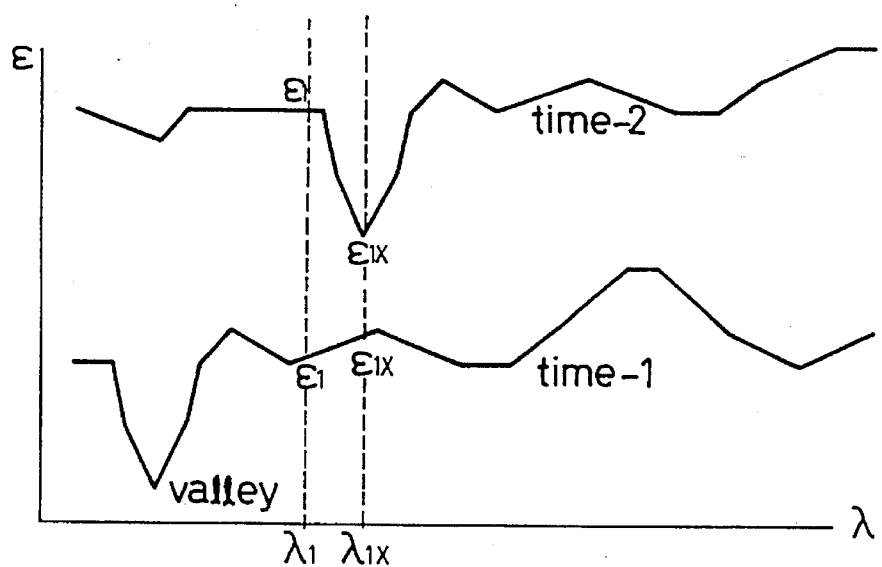
FIG. 7 is a diagram showing emissivity spectrums for nearby two wavelengths of a surface with an oxide film formed thereon.
Figure 8:
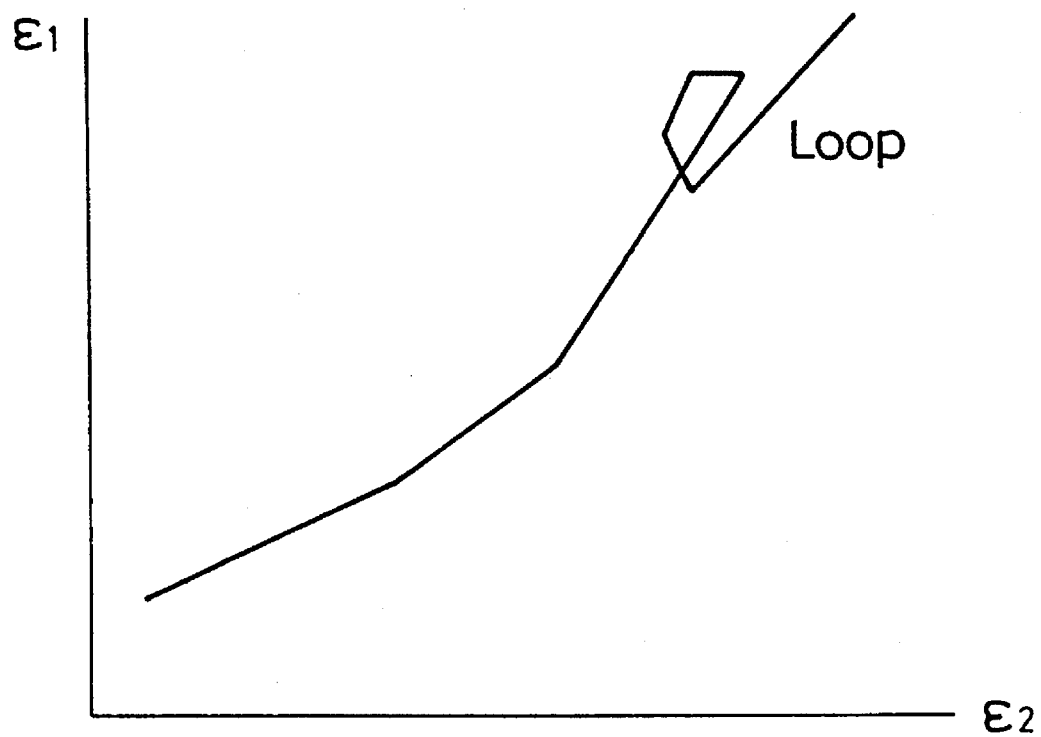
FIG. 8 is a diagram showing a correlation between emissivities for two wavelengths.

Embodiments of the present invention will be described below with reference to the accompanying drawings.

The present invention is such that is designed with a concept greatly changed from a conventional idea (indirect control by temperature). It is intended therein to solve the problem by utilizing a parameter closer to the physical value as the control target, namely, an emissivity power ratio is used as the controlled parameter in on-line process control. Accordingly, the invention is is generally applicable to the cases where a material to be processed emits radiation energy while it is in process. The present embodiment will be described with reference to the drawings assuming for simplicity that silicon is used as the material to be processed. Reference characters used in the drawings are like or corresponding to those used in the above described conventional examples.

Figure 12:
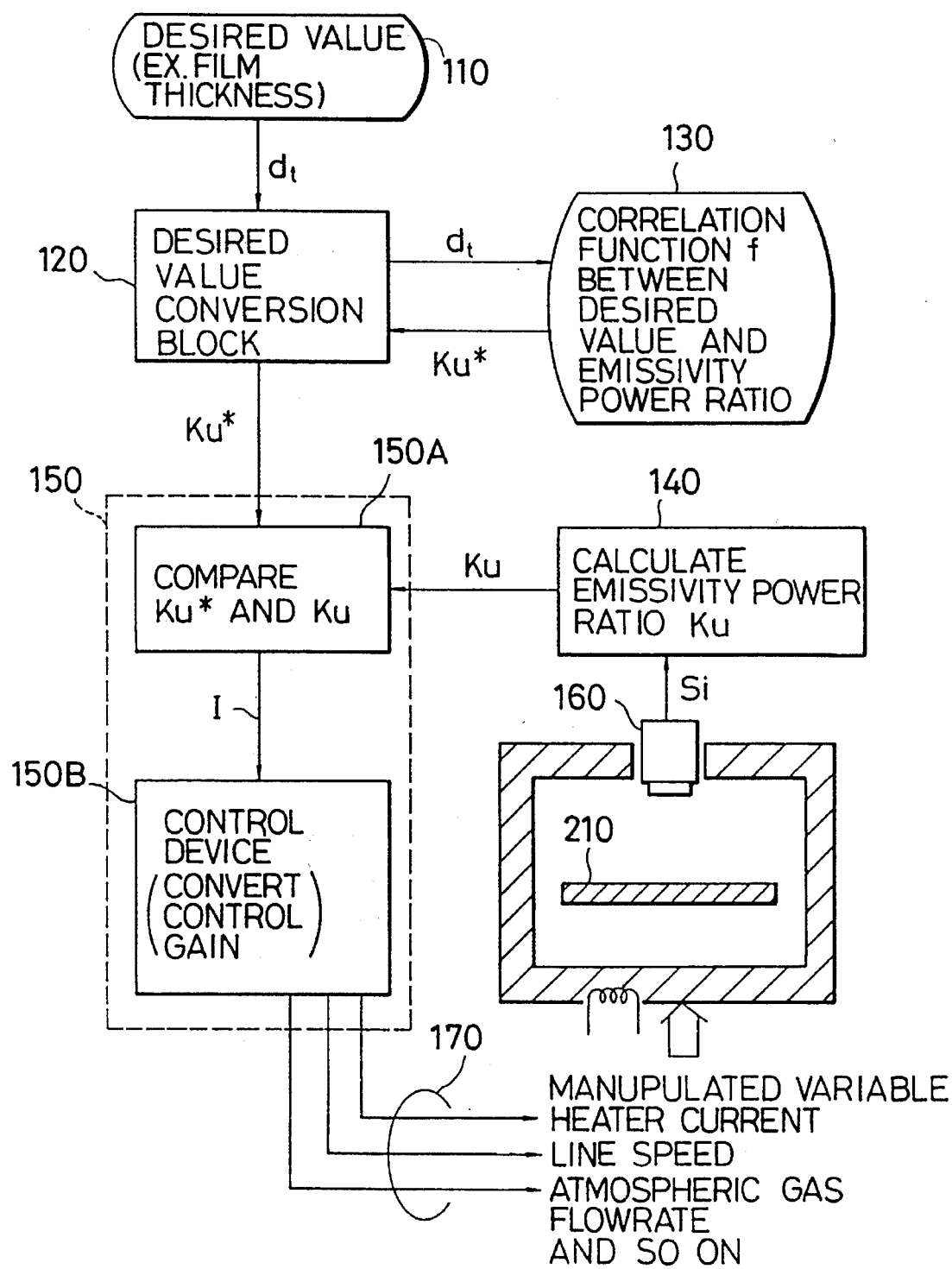
FIG. 12 is a block diagram showing a first embodiment of a process controlling apparatus of the present invention.

In FIG. 12 is shown structure of a first embodiment of the process control apparatus of the present invention. The process control apparatus constitutes a control system which has a direct desired value (for example the film thickness d), with the use of the emissivity power ratio Ku* ([the $\lambda_i$ power of $\epsilon_i$]/[the $\lambda_j$ power of $\epsilon_j$]; $\epsilon_i$ and $\epsilon_j$ being emissivities of the material in process at wavelengths $\lambda_i$ and $\lambda_j$) used as the indirect desired value, established as the target and has the measured value Ku of the measured emissivity power ratio obtained from detection signals $S_i$ ($S_1$, $S_2$, . . . ) detected by a radiation sensor 160 established as the controlled variable. Description will be given on the elements constituting the present apparatus.

Figure 13:
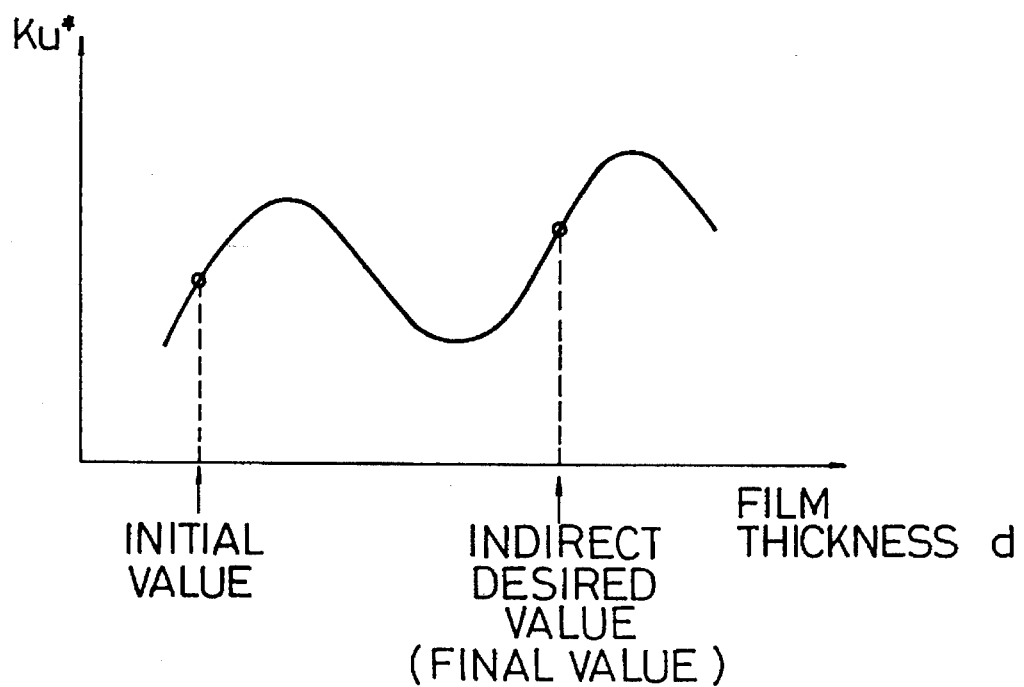
FIG. 13 is an explanatory diagram of a history from initial value to final value of the emissivity power ratio Ku*.

A desired value conversion block 120 accepts a desired value (for example silicon oxide film thickness d [μm]) input from the outside (manually or on-line), derives the emissivity power ratio Ku* (indirect desired value) corresponding to the desired value using the correlation between the direct desired value and the emissivity power ratio value, and outputs the history of the emissivity power ratio Ku* from its initial value to its final value (refer to FIG. 13). Here, a correlation block 130 provides the correlation between the direct desired value and the emissivity power ratio value as shown in the following expression (6) and converts the direct desired value from the desired value conversion block 120 to emissivity power ratio Ku*. The correlation function f in the expression (6) is obtained from a conversion table based on experimental values or theoretical calculation or by numerical calculation.

$$[\epsilon_i^{\lambda_i}/\epsilon_j^{\lambda_j}] = f(\text{real control target}) \quad (6)$$

A radiation sensor 160 comprises a photoelectric conversion element and a spectroscopic filter, and it, by observing detected radiation energy from a material in process 210 with a plurality of different wavelengths ($\lambda_1$, $\lambda_2$, . . . ), detects brightness temperatures at the plurality of wavelengths $\lambda_i$ and outputs them as detection signals $S_i$ ($S_1$, $S_2$, . . . ). Incidentally, the measurement center wavelengths (peak sensitivity wavelengths) of industrially used photoelectric conversion elements are around 1.0 μm with Si, around 1.6 μm with Ge, around 2.0 μm with PbS, and around 4.0 μm with PbSe. A wavelength slightly below or above such peak wavelength is used for measurement by adjusting transmitted wavelength of a spectroscopic filter, though the quantum element sensitivity decreases to a certain degree. (For example, the peak of transmitted wavelength of the spectroscopic filter is set to 0.9 μm when $S_i$: 1.0 μm is used.) An emissivity power ratio calculation block 140 obtains a plurality of measured emissivity power ratios Ku from the plurality of detection signals $S_i$ according to the expression (3). For example, the emissivity power ratio Ku for i=1 and 2 is given by [the $\lambda_i$ power of $\epsilon_1$]/[the power of $\epsilon_2$].

Figure 14:
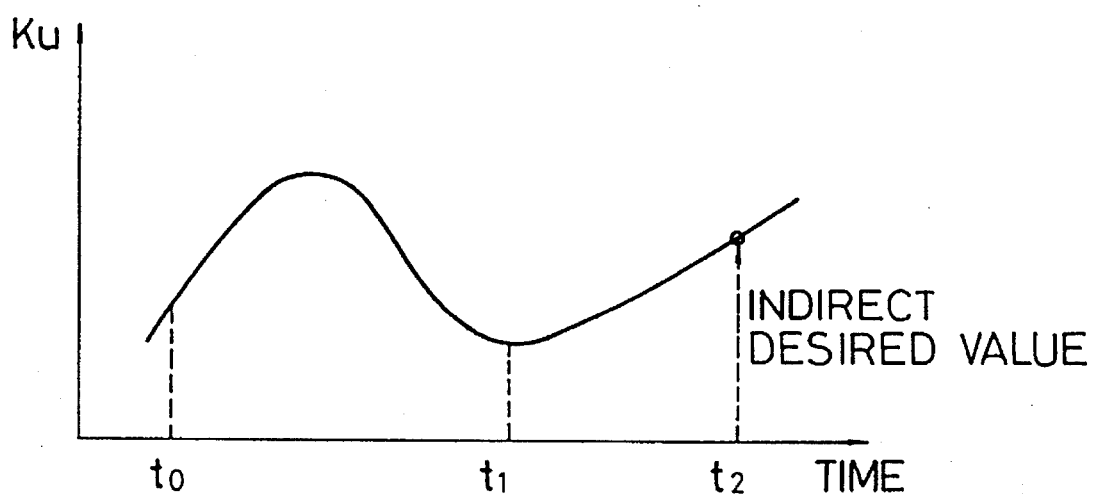
FIG. 14 is an explanatory diagram of time variation of emissivity power ratio Ku.

In the portion denoted by reference numeral 150 is formed an automatic control system having the emissivity power ratio Ku* as the indirect desired value and the measured emissivity power ratio Ku as the controlled amount and outputting a control signal of a manipulated variable 170 (heater current, line speed, atmospheric gas flow rate, or the like), and it comprises a comparison portion 150A comparing the emissivity power ratios Ku* and Ku to output the comparison result I and a control device 150B outputting the control signal of the manipulated variable 170 from the comparison result I. The automatic control system 150, when the emissivity power ratio Ku is a multi-valued function, executes control determining to which desired value an emissivity power ratio Ku corresponds. For example, when an emissivity power ratio Ku varies as the oxide film thickness d increases with the passage of time as shown in FIG. 14, the automatic control system 150 detects that the measured emissivity power ratio Ku has reached a peak between $t_0$ and $t_1$ and finds out that the oxide film thickness d is increasing (though the emissivity power ratio Ku is decreasing), and when the a prescribed oxide film thickness d is approached between $t_1$ and $t_2$, executes such control as to gradually lower the temperature.

In the above control device and the like, known control hardware and the like are used. With the described arrangement, the manipulated variable 170 is automatically controlled in accordance with the desired value and, thereby, control is executed such that the appropriate controlled variable of the material in process 210 (the actual film thickness of the processed material 210) attains the desired value. The operating principle will be described below.

The spectral emissivities of double layers such as parallel thin films of the silicon oxide on silicon wafer are given by the following expressions (7) and (8) derived from optical theories.

$$\gamma_i = (2\pi/\lambda_i) \, 2nd \cos\theta \quad (7)$$

$i = 1,2$

-continued $$\epsilon_i = 1 - \{\rho_a + \rho_b + 2\sqrt{(\rho_a\rho_b)}\cos\gamma_i\}/\{1 + \rho_a\rho_b + 2\sqrt{(\rho_a\rho_b)}\cos\gamma_i\} \quad (8)$$

$i = 1,2$ where $\rho_a$: reflectivity at the boundary between the oxide film and the air $\rho_b$: reflectivity at the boundary between the oxide film and the unoxidized portion θ: angle of refraction at the boundary between the oxide film and the unoxide portion [rad]

n: refractive index of the oxide film d: oxide film thickness [μm].

Figure 15:
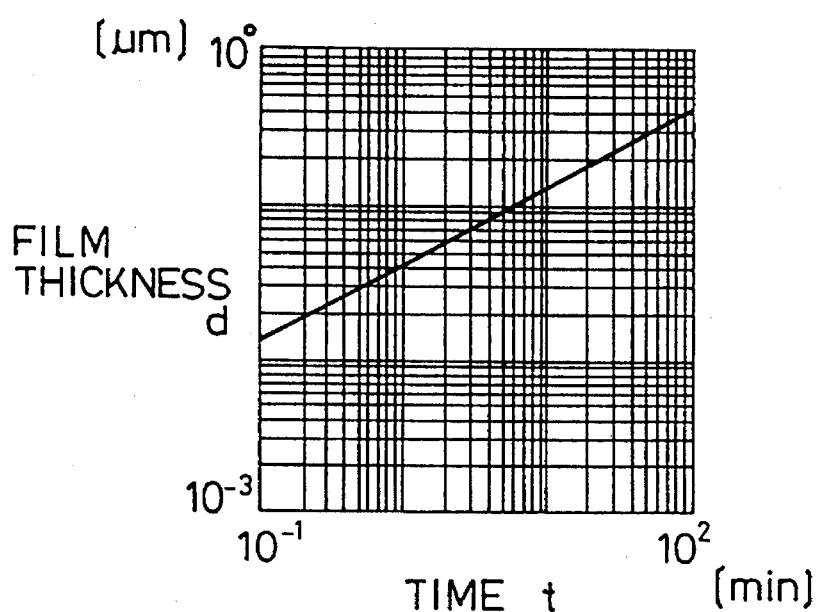
FIG. 15 is a graph showing growth with time of an oxide film.

Using the above theoretical value of the emissivity, variation of the emissivity during the process can be obtained. From the reaction theories related to the process temperature and the growth of the oxide film with the passage of time, the thickness of the oxide film under the condition of constant temperature is proportional to the process time or the square root of the process time. This is well known from the reaction theory. When film thickness is thin, it varies as shown in FIG. 15 under the temperature of 1400° C.

Figure 16:
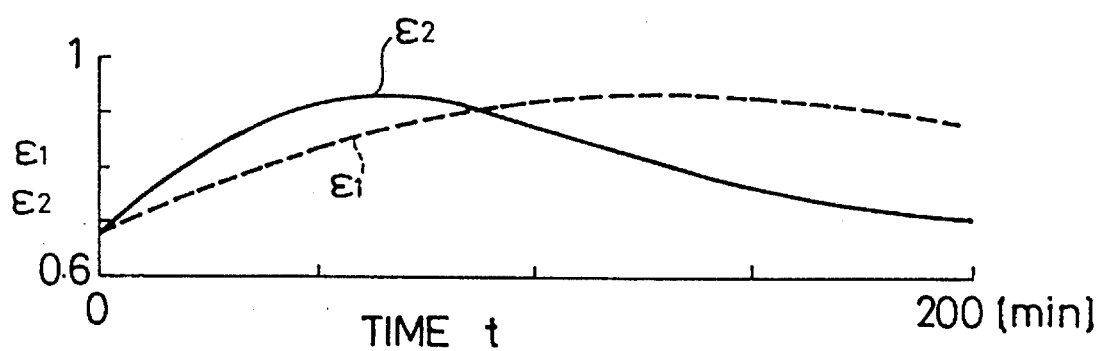
FIG. 16 is a graph showing time variation of emissivities.

In silicon surface processing, the above optical theoretical expressions (7) and (8) hold well. Concerning this subject, there are detailed descriptions in a reference, Watanabe (Hitachi Laboratory of Mechanics), et al.: "Measurement of Wafer Temperature within Semiconductor Heat Treatment Apparatus by Radiation Thermometer", The Transactions of the Japanese Institute of Measurement and Automatic Control Engineers, Vol. 25, No. 9, pp. 925–931 (1989), a reference, Schiroky, G. H. (GA Technologies, Inc., San Diego, Calif.): "In situ measurement of silicon oxidation kinetics by monitoring spectrally emitted radiations", J. of Materials Science 22, (1987), pp. 3595 to 3601, a reference, Colavito, D. B. and Trimble L. E. (AT & T Lab., New Jersey): "Effect of External Silicon Dioxide and Silicon Roughness on the Radiative Melting of Silicon", Vol. 134, No. 5, pp. 1211– 1220, and others, and it is known that there are good concurrence between experimental results and the theoretical values of emissivity given by the expressions (7) and (8) at least in the region of the film thickness as thin as less than 1 μm, which will be the direct desired value in the future thin film formation process control. From this, when the wavelength $\lambda_1$ is 2 μm and the wavelength $\lambda_2$ is 1.414 μm, the spectral emissivities $\epsilon_1$ and $\epsilon_2$ become as shown in FIG. 16 when $\rho_1$=0.034, $\rho_2$=0.186, and n=1.45 are used.

Figure 17:
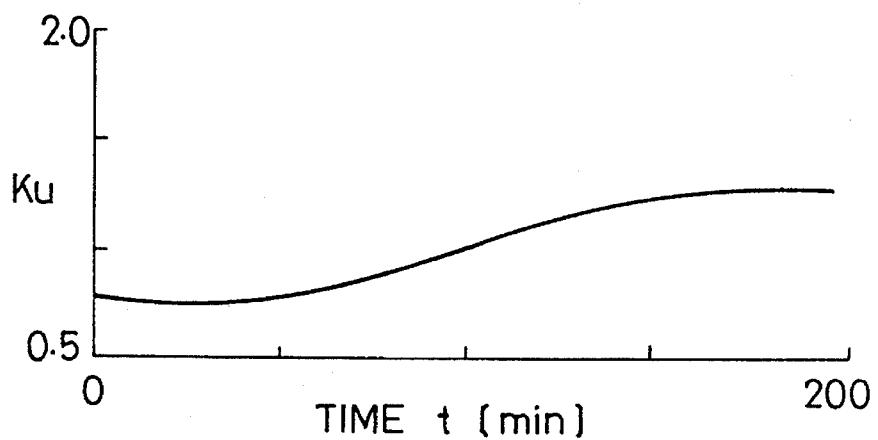
FIG. 17 is a graph showing time variation of an emissivity power ratio.
Figure 18:
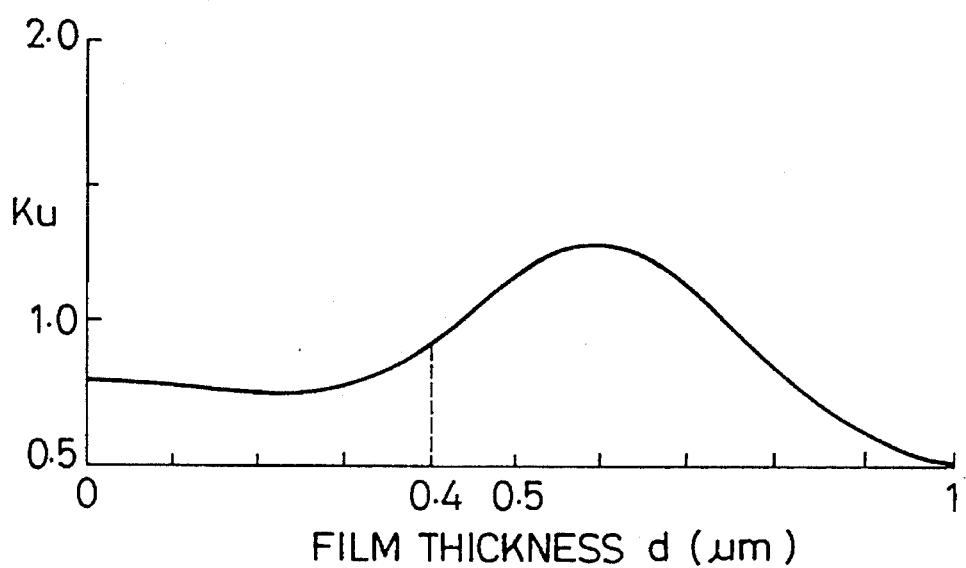
FIG. 18 is a graph showing a relationship between oxide film thickness and emissivity power ratio.

When the angle formed between the radiation sensor 160 and a normal to the surface of the material 210 (measurement angle) is set to 45 degrees, the emissivity power ratio Ku ([the $\lambda_i$ power of $\epsilon_1$]/[the $\lambda_j$ power of $\epsilon_2$]) varies as shown in FIG. 17. The relationship between the oxide film thickness d and the emissivity power ratio Ku becomes as shown in FIG. 18, in which the oxide film thickness d is a two-value function of the emissivity power ratio Ku. The apparatus shown in FIG. 12 uses such a correlation between the direct desired value and the emissivity power ratio target and executes control such that the measured value of the emissivity power ratio Ku obtained from the detection signals $S_i$, i.e., the direct controlled variable (oxide film thickness or the like), attains the direct desired value.

In the case where there are present the correlation between the oxide film thickness d and the emissivity power ratio Ku as shown in FIG. 18, if it is aimed to form the oxide film thickness d of 0.4 μm (the initial value: 0 μm), the apparatus of FIG. 12 makes the following operation. The history of the emissivity power ratio Ku* from the initial value (0 μm) to the final value (0.4 μm) corresponding to the measurement angle, the detection wavelength, and the direct desired value (0.4 μm) is selected in the correlation block 130 and output therefrom to the automatic control system 150. The automatic control system 150 controls the manipulated variable 170 while detecting the oxide film thickness of the material in process 210 in accordance with the emissivity power ratio Ku obtained in the emissivity power ratio calculation block 140 from the detection signals of the radiation sensor 160. It causes the formation of the oxide film to stop when the oxide film thickness of the material in process 210 reaches the desired value (0.4 μm). Thus, control is executed by regulating the manipulated variable (heater current etc.).

The correlation between the direct real controlled value and the emissivity power ratio takes on various forms depending on various parameters such as the measurement angle, detection wavelength, and material property. Various types of the correlation corresponding to various measurement angles and detection wavelengths will be shown below with for example silicon taken as the material. Although there are limits to use of the measurement wavelength $\lambda_i$ at present on account of absorption of radiation by the air and availability of the material of the photoelectric conversion quantum element, it is expected that photoelectric conversion elements having many observable wavelengths become available in future as the consequence of studies on optical quantum materials being made now. Therefore, the case where the observation wavelength band is not obtainable at present from industrial photoelectric conversion elements on the market, like that of 0.5 μm, will also be shown.

Figure 19:
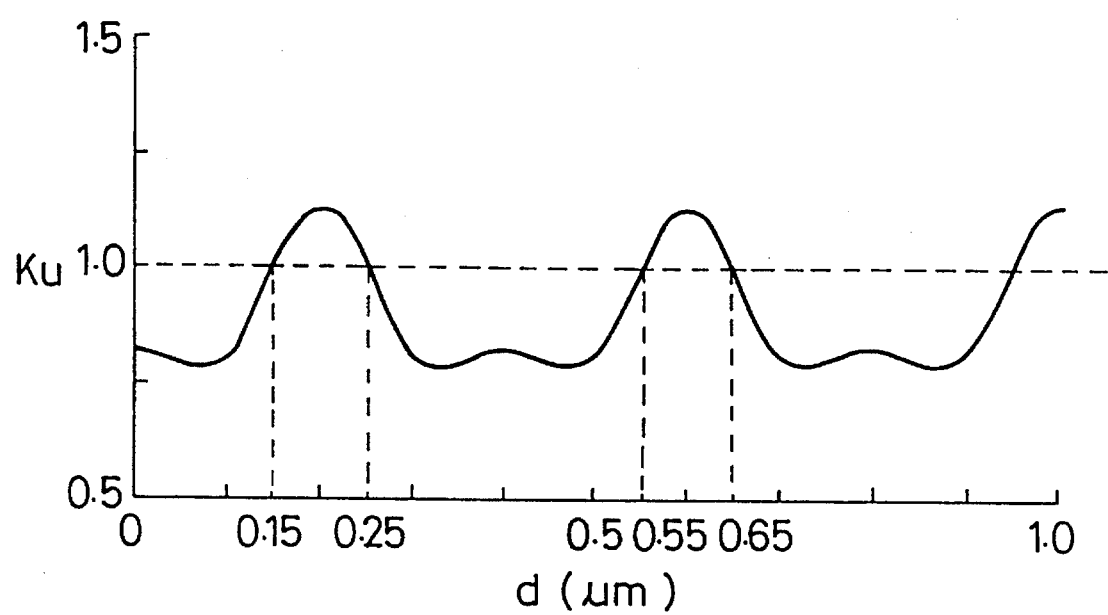
FIG. 19 is a graph showing a relationship between oxide film thickness and emissivity power ratio.

FIG. 19 shows variation of the emissivity power ratio with respect to the oxide film thickness d when the measurement wavelengths $\lambda_1$ and $\lambda_2$ are 1.0 μm and 0.5 μm, respectively, and the measurement angle θ is 30°. (Since the material in process 210 is silicon now, $\rho_1=0.034$, $\rho_2=0.186$, and n=1.45. The same will also apply to the following.) In the region of the oxide film thickness from 0.15 μm to 0.25 μm, the emissivity power ratio Ku≧1.0 holds, and also in the region of the oxide film thickness from 0.55 μm to 0.65 μm, the emissivity power ratio Ku≧1.0 holds. Then, by using the history of the emissivity power ratio Ku* and detecting the peak value of the emissivity power ratio Ku which is obtained from the detection signals $S_i$, it can be determined to which oxide film thickness d the emissivity power ratio Ku corresponds.

In the present case, the emissivity power ratio. Ku obtained from the detection signals $S_i$ takes up a first peak value when the oxide film thickness d increases and becomes 0.2 μm. Since the oxide film thickness once formed never becomes thinner, the decrease from the peak value indicates that the oxide film thickness d is increasing. Then, when the emissivity power ratio Ku takes up second peak value, it is detected that the oxide film thickness d is 0.6 μm. In the described manner, even if two or more values of the oxide film thickness d correspond to one emissivity power ratio Ku, the oxide film thickness d can be correctly detected.

Figure 20A:
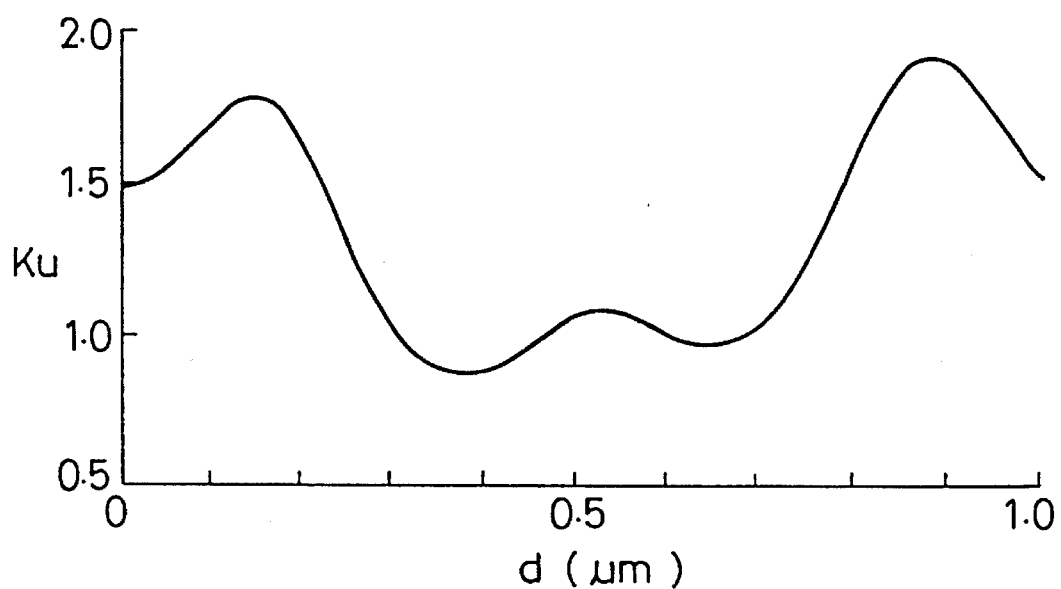
FIG. 20A is a graph showing a relationship between oxide film thickness and emissivity power ratio.
Figure 20B:
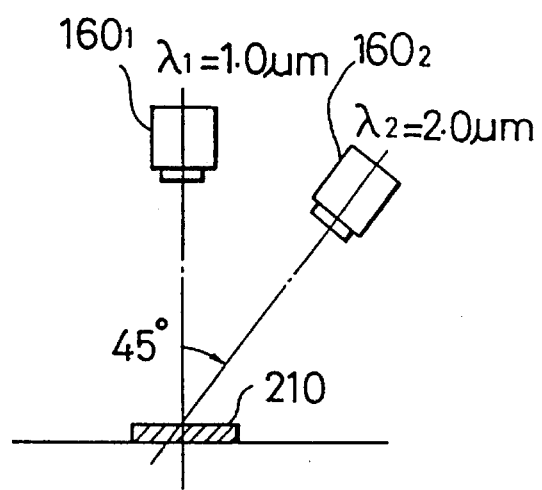
FIG. 20B is an explanatory diagram of a measurement arrangement in which parameters are changed.

FIG. 20A shows variation of the emissivity power ratio when two single-color thermometers $160_1$ and $160_2$ were used as the radiation sensor 160, with the measurement angle θ of the single-color thermometer $160_1$ whose measurement wavelength $\lambda_1$ is 1.0 μm set to 0° and the measurement angle θ of the single-color thermometer $160_2$ whose measurement wavelength $\lambda_2$ is 2.0 μm set to 45° (FIG. 20B).

Figure 21A:
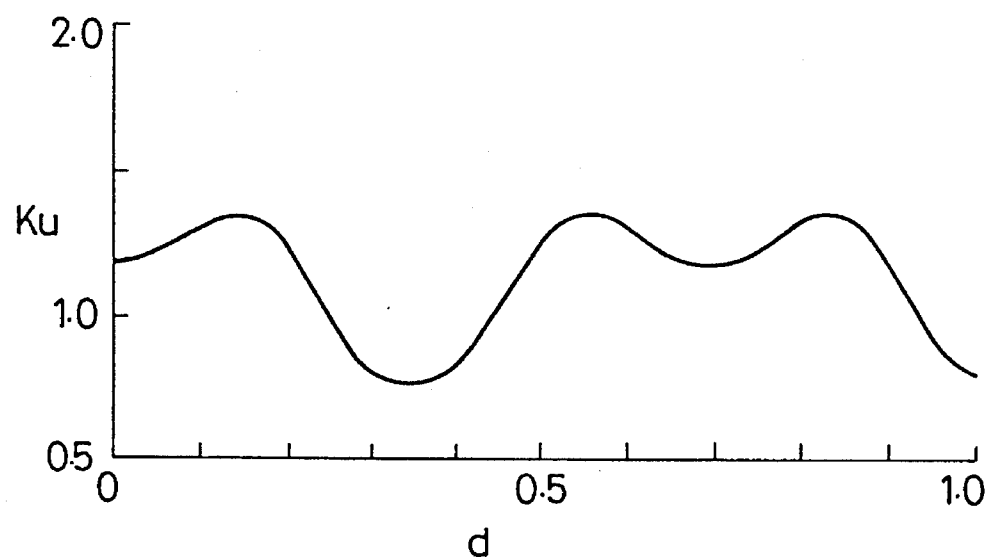
FIG. 21A is a graph showing a relationship between oxide film thickness and emissivity power ratio.
Figure 21B:
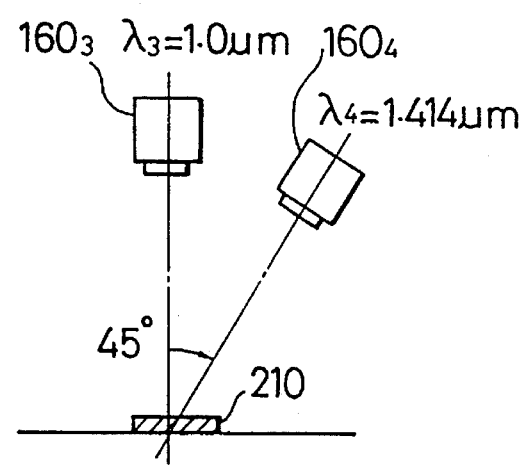
FIG. 21B is an explanatory diagram of a measurement arrangement in which parameters are changed.

FIG. 21A shows variation of the emissivity power ratio when two single-color thermometers $160_3$ and $160_4$ were used as the radiation sensor 160, with the measurement angle θ of the single-color thermometer $160_3$ whose measurement wavelength $\lambda_3$ is 1.0 μm set to 0° and the measurement angle θ of the single-color thermometer $160_4$ whose measurement wavelength $\lambda_4$ is 1.414 μm set to 45° (FIG. 21B). Also with such arrangements, it can be detected what value of the oxide film thickness d is corresponding to the value of emissivity power ratio Ku by using the history of the emissivity power ratio Ku*.

Figure 22A:
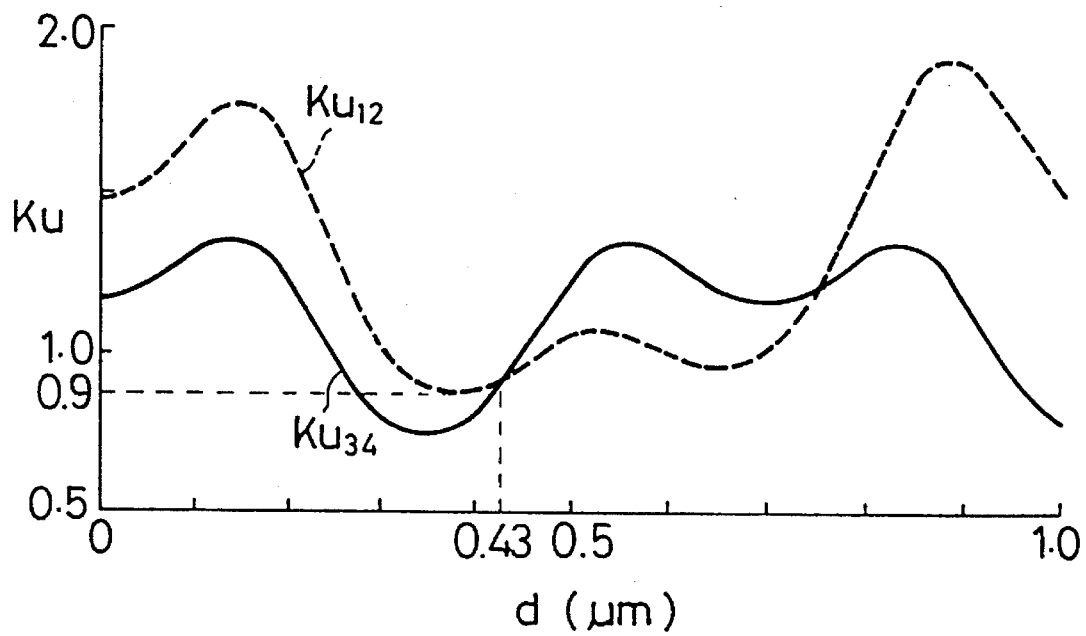
FIG. 22A is a graph showing a relationship between oxide film thickness and emissivity power ratio.
Figure 22B:
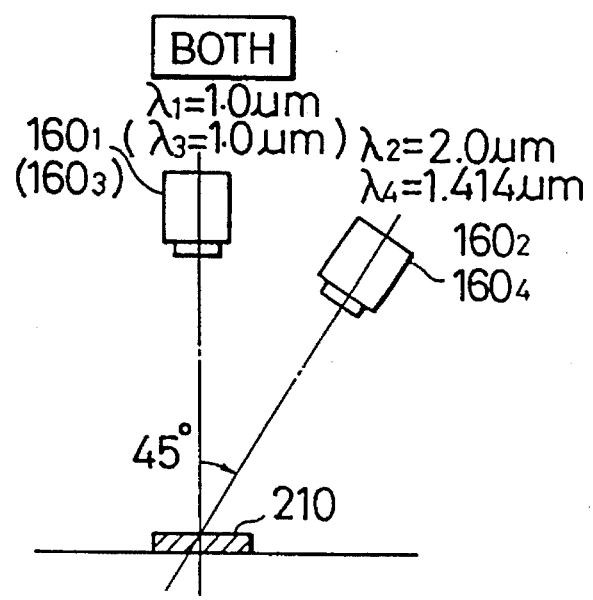
FIG. 22B is an explanatory diagram of a measurement arrangement in which parameters are changed.

FIG. 22A shows a similar graph in the case all of the single-color thermometers $160_1$ to $160_4$ shown in both FIG. 20B and FIG. 21B were used as the radiation sensor 160 (FIG. 22B). In this arrangement of the radiation sensor 160, the oxide film thicknesses d can be detected from the emissivity power ratio $Ku_{12}$ derived from the single-color thermometers $160_1$ and $160_2$ and the emissivity power ratio $Ku_{34}$ derived from the single-color thermometers $160_3$ and $160_4$ by using histories of the emissivity power ratios $Ku*_{12}$ and $Ku*_{34}$, respectively, and control is executed so that the direct controlled variable (oxide film thickness of 0.4 μm) is attained. For example, if it is aimed to form an oxide film thickness d of approximately 0.43 μm, the operation of the apparatus will be as follows. Histories of the emissivity power ratio $Ku*_{12}$ and $Ku*_{34}$ corresponding to the direct desired value (0.43 μm) are selected in the correlation block 130, and the operation amount 170 is controlled while the oxide film thickness d of the material in process 210 is being detected according to the emissivity power ratio $Ku_{12}$ and $Ku_{34}$, which are derived from detection signals of the single-color thermometers $160_1$, $160_2$, $160_3$, and $160_4$, or the difference therebetween ($Ku_{12}$–$Ku_{34}$). When $Ku_{12}$ and $Ku_{34}$ become approximately equal to 0.9 and, hence, the oxide film thickness of the material in process 210 attains the control target (0.43 μm), the formation process of the oxide film thickness should be stopped.

Figure 23:
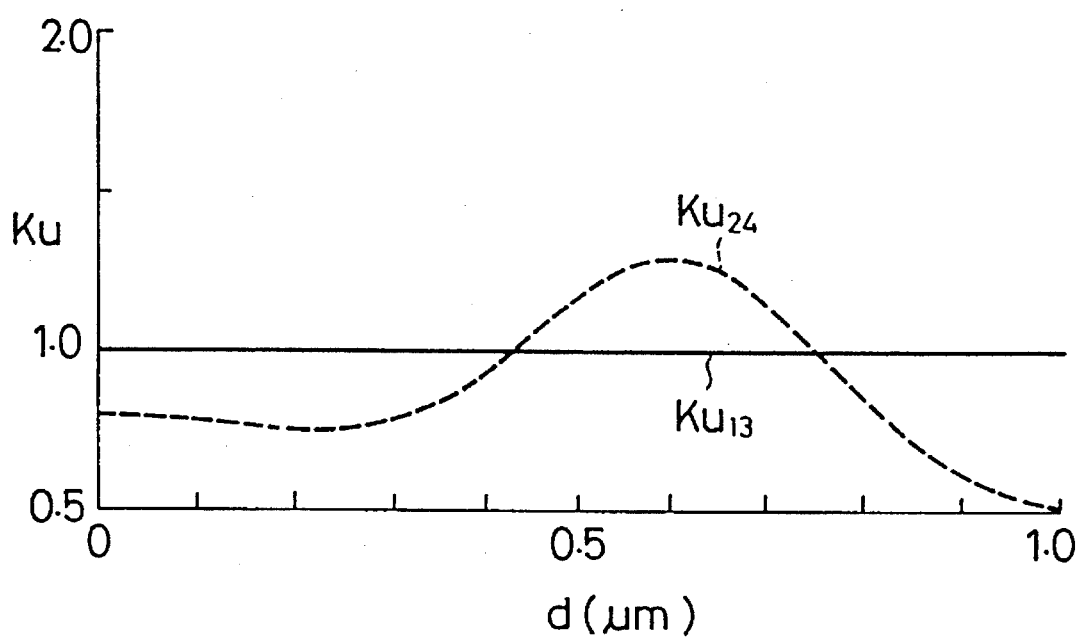
FIG. 23 is an explanatory diagram of emissivity power ratios obtained by a different manner of taking the emissivity power ratio.

In this arrangement, the number of the cases, where two emissivity power ratios $Ku_{12}$ and $Ku_{34}$ take up the same value with respect to one oxide film thickness d during the process are less than that of the cases where only one emissivity power ratio Ku is used. Hence, detection with smaller error can be achieved. FIG. 23 shows the case where the manner of obtaining the emissivity power ratios was changed. Namely, it shows variations of emissivity power ratios, of which an emissivity power ratio $Ku_{13}$ was derived from the same single-color thermometers $160_1$ and $160_3$ and an emissivity power ratio $Ku_{24}$ was derived from the single-color thermometers $160_2$ and $160_4$. The emissivity power ratio $Ku_{13}$ takes up a constant value 1.0 ($\epsilon_1^{\lambda_1}=\epsilon_3^{\lambda_3}$) and the emissivity power ratio $Ku_{24}$ varies the same as shown in FIG. 18. As in this case, it sometimes occurs, depending on the manner of taking the emissivity power ratios, that the results become the same as obtained when only a single emissivity power ratio Ku is used.

Figure 24A:
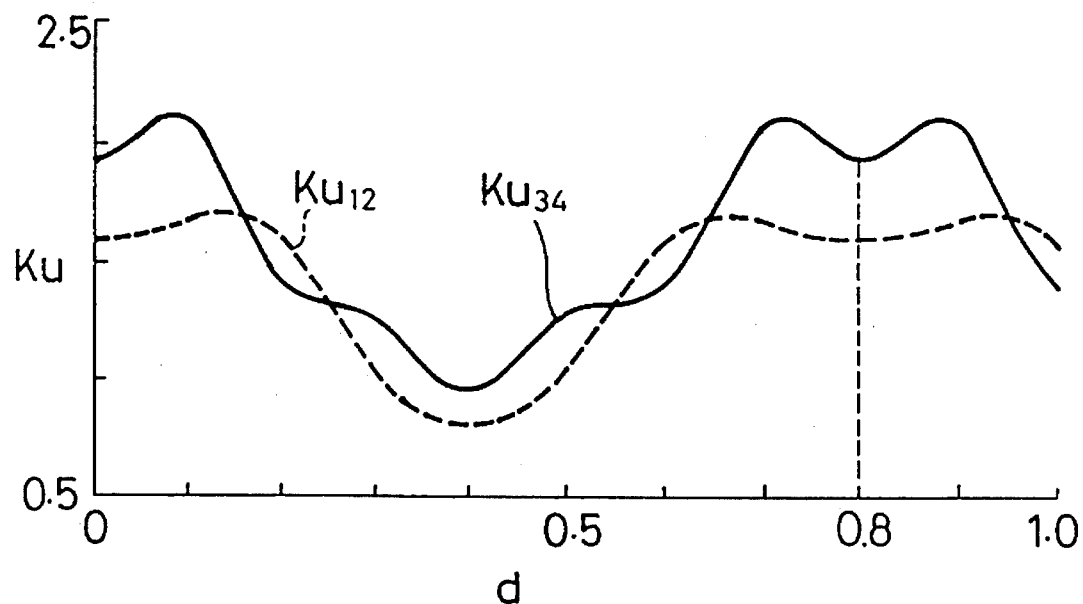
FIG. 24A is a graph showing a relationship between oxide film thickness and emissivity power ratio.
Figure 24B:
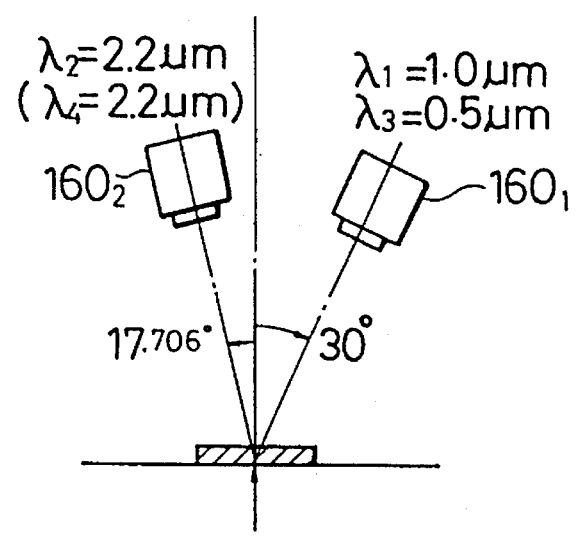
FIG. 24B is an explanatory diagram of a measurement arrangement in which parameters are changed.
Figure 25:
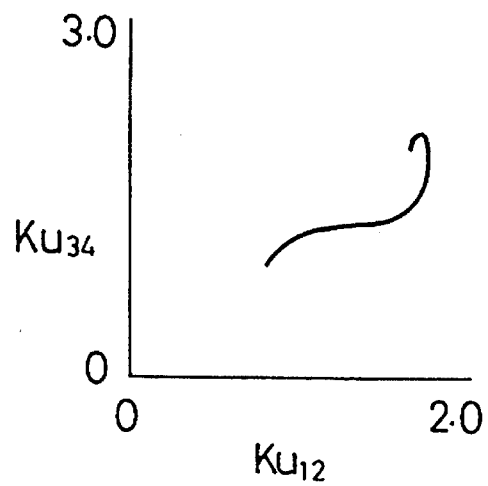
FIG. 25 is a graph showing a correlation between the emissivity power ratios $Ku_{12}$ and $Ku_{34}$ in FIG. 24.
Figure 26:
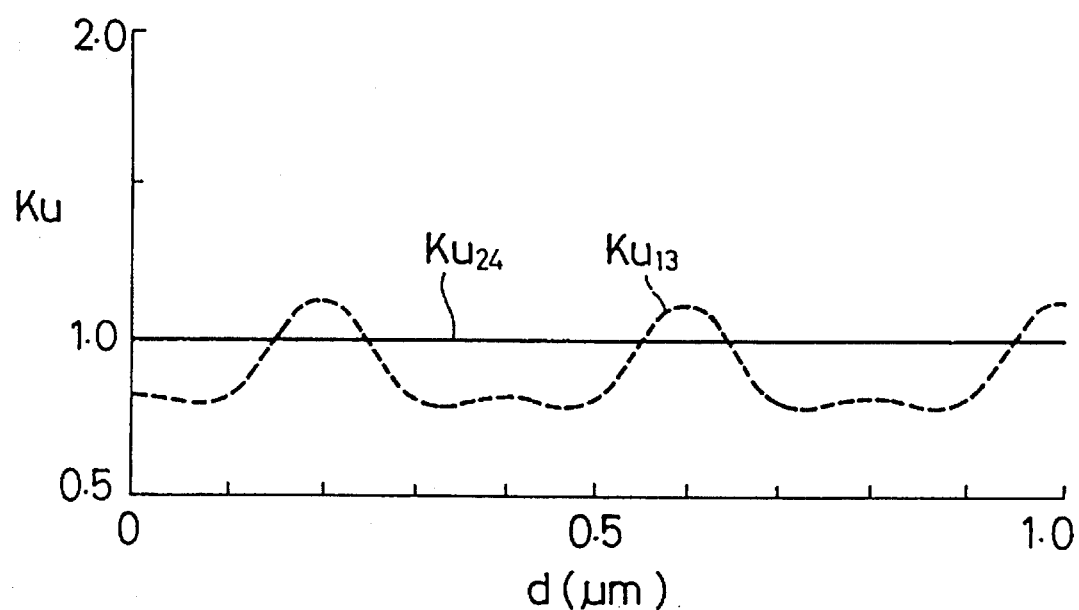
FIG. 26 is an explanatory diagram of emissivity power ratios obtained by a different manner of taking the emissivity power ratio.

FIG. 24A shows variations of the emissivity power ratios when a two-color thermometer $160_1$ (two single-color thermometers are also applicable) whose measurement wavelength $\lambda_1$ is 1.0 μm and measurement wavelength $\lambda_3$ is 0.5 μm is arranged at a measurement angle θ of 30° and a single-color thermometer $160_2$ whose measurement wavelength $\lambda_2$ ($\lambda_4$) is 2.2 μm is arranged at a measurement angle θ of 17.706° (FIG. 24B). In this case, both the two emissivity power ratios $Ku_{12}$ and $Ku_{34}$ are periodic functions of the oxide film thickness d of 0.8 μm. Accordingly, there are more cases where two emissivity power ratios $Ku_{12}$ and $Ku_{34}$ take up the same value with respect to one oxide film thickness d than in the arrangement shown in FIG. 22, and the correlation between the emissivity power ratio $Ku_{12}$ and $Ku_{34}$ becomes simple as shown in FIG. 25. Also in this case, the same as in the case of FIG. 19, the oxide film thickness d corresponding to the emissivity power ratio Ku can be detected by monitoring variations of the emissivity power ratios $Ku_{12}$ and $Ku_{34}$ and using the histories of the emissivity power ratios $Ku^*_{12}$ and $Ku^*_{34}$. When the manner of taking the emissivity power ratios is changed, the results sometime become the same as obtained when only a single emissivity power ratio Ku is used, like the case shown in FIG. 23 (FIG. 26).

As the emissivity power ratio takes up various forms according to types of parameters, the desired value such as oxide film thickness can be attained by selecting them. Further, in case there are a plurality of the values (for example the oxide film thickness d) obtained for a single value of the emissivity power ratio, such a difficulty can be overcome by using some technique as described above for the control method (such as the oxide film thickness d), which will be summarized below.

(1) The pattern of variation of the emissivity power ratio from the start (when the film thickness is 0) is monitored and it is detected to what film thickness a specific pattern of the variation of the emissivity power ratio Ku corresponds (FIG. 19 and others).

Figure 27:
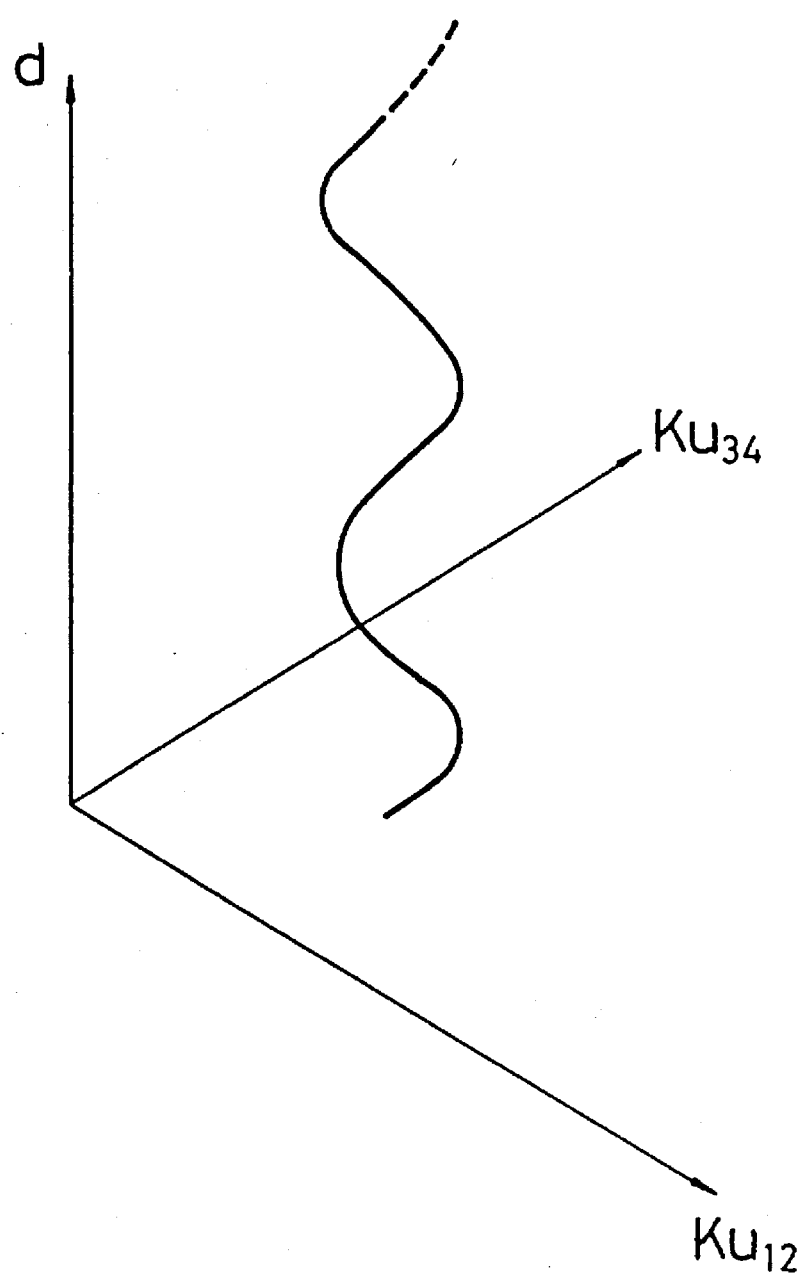
FIG. 27 is a three-dimensional graph showing relationships among an oxide film thickness and two emissivity power ratios.

(2) By combining a plurality of emissivity power ratios, control is executed by the values of a plurality of emissivity power ratios corresponding to the desired film thickness, namely, by the indirect desired value made of a combination of target values (FIG. 22A, FIG. 24A). Particularly in this case, the number of desired value corresponding to a single emissivity power ratio decreases (refer to FIG. 27) and, hence, control becomes simpler and detection free of error can be achieved.

For the radiation sensor 160, no special sensors are required but conventional two-color thermometers or plurality of single color pyrometers can be used. Therefore, particularly when a plurality of emissivity power ratios are combined as in the cases of FIG. 22A and FIG. 24B, it also becomes possible to add temperature to the control variable. In such a case, the accuracy in the surface temperature measurement while the surface oxidation is in progress can be improved because the measurement temperature can be corrected by the oxide film thickness d. By such arrangement, a temperature control system can be incorporated in the process control system in addition to the control loop of the present invention and thus a fail safe system with dual control system can be structured.

The correlation between the direct controlled variable and the emissivity power ratio target can be obtained by experiments or theoretical expressions, and therefore, when indirect control is executed using the emissivity power ratio, it becomes easy to determine such control parameters as the control gain. When, in particular, a highly reliable correlation function "f" showing the relationship between the direct controlled variable and the emissivity power ratio is obtained through a sufficiently large number N of experiments or by using sufficiently accurate theoretical expressions, control accuracy equivalent to that of direct control by the film thickness or the like, which has so far been unobtainable, can be obtained. Since, in the present invention, a direct desired value such as the oxide film thickness and galvannealing degree is detected and controlled not by using the conventional process accelerating parameter, "temperature", but by using the emissivity power ratio obtained from the radiation energy emitted from the material in process, the accuracy in the control can be improved. Accordingly, such merits can be obtained that process quality is improved, irregularities in the process are reduced, and quality of products and yield rate are improved.

The present invention is not limited to the above described embodiment but various changes can be possible.

Of industrial materials, a silicon wafer is virtually a pure substance, and therefore, theoretical expressions on it are very close to actual measurements in the region of it being of a thin film thickness, and hence, very good film thickness control of it is possible. Accordingly, description has so far been given taking silicon as an example, but the present invention can be applied to general materials on which surface oxidation is in progress, for example to stainless steel plate, aluminum, and aluminum alloys. It is because expressions (7) and (8) are basically applicable to any oxide film. In case of oxidation of iron and steel or aluminum, for example, it is known that the periods of the expressions (7) and (8) are virtually equal and the value of the emissivity tends to converge to a large value in a damping manner. This phenomenon is considered to be chiefly due to optical absorption by the material and surface roughness as well as a nonparallel structure of the oxide film. Hence, in other cases than that of the silicon oxide film, it is desirable that the correlation function "f" between the direct desired value and the emissivity power ratio target is determined by experiments. But, when theoretical expressions are established in the future, the correlation function "f" may be determined using such theoretical expressions.

Concerning galvannealing degree, crystal grain size, and surface roughness, there are no theoretical expressions, and therefore, the correlation function "f" between the direct desired value and the emissivity power ratio target is determined for use by experiments. By measuring such physical amounts with the use of the emissivity power number and making correction with the obtained results, accuracy can be greatly improved.

Figure 28:
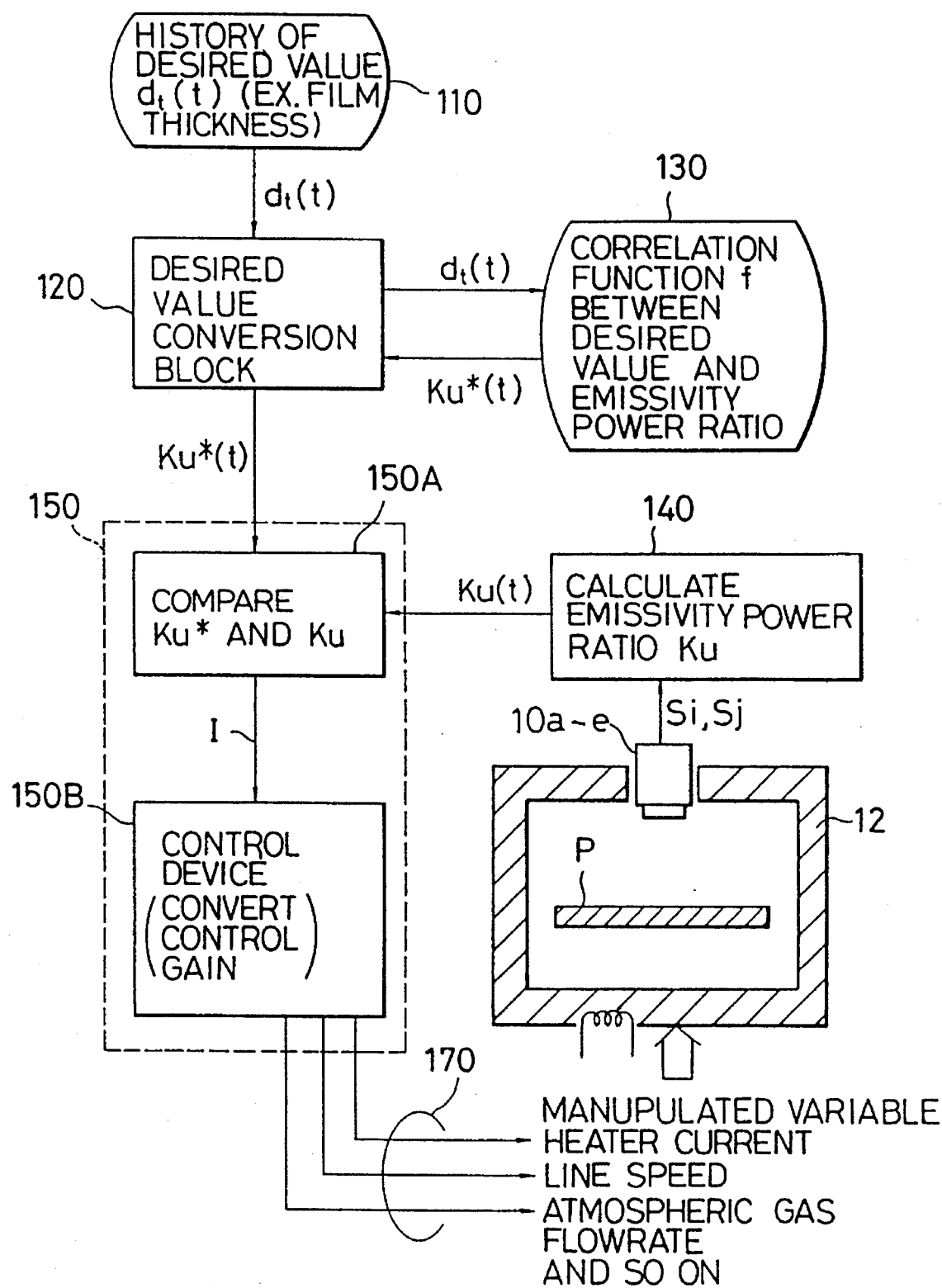
FIG. 28 is a block diagram conceptually showing a process controlling apparatus of a second embodiment of the present invention.
Figure 29:
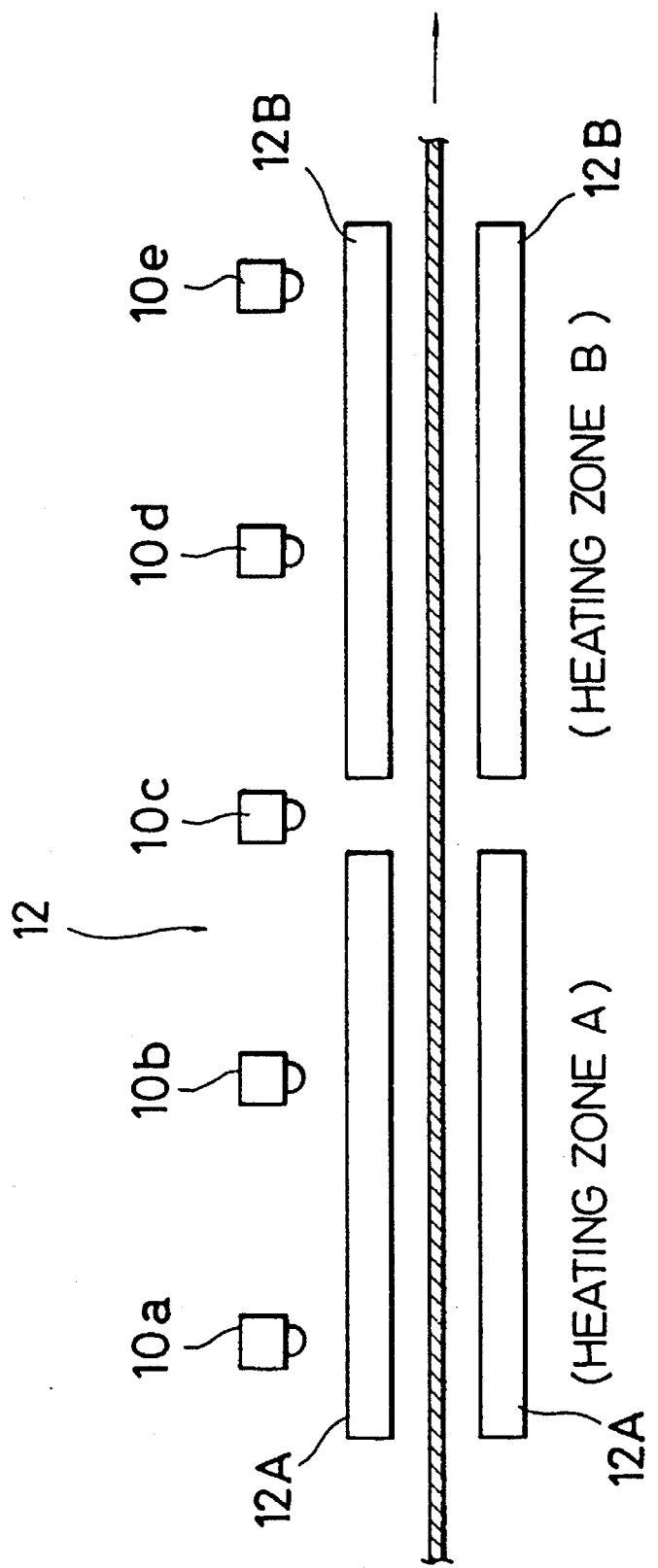
FIG. 29 is a schematic side view of a continuous annealing furnace used in the second embodiment.

FIG. 28 is a block diagram conceptually showing a second embodiment of the process control apparatus according to the present invention and FIG. 29 is a side view schematically showing a continuous annealing furnace incorporated in the control apparatus.

The process control apparatus of the present embodiment comprises a plurality of radiation thermometers 10a–10e arranged along an annealing furnace (continuous process line) 12 for continuously annealing a steel plate (material in process) P emitting radiation energy and an emissivity power ratio calculation block 140 for calculating emissivity power ratios according to the following expression (3A) corresponding to the above mentioned expression (3) using brightness temperatures $S_i$ and $S_j$ measured on-line by each of the radiation thermometers 10a–10e for different wavelengths $\lambda_i$ and $\lambda_j$.

$$\epsilon_i^{\lambda i}/\epsilon_j^{\lambda j}=\exp\{C_2(1/S_j-1/S_i)\} \quad (3A)$$

where i, j: integers, i≠j,

C2: Planck's second constant.

The above process control apparatus further comprises a correlation block (data storage portion) 130 for storing the correlation data (correlation function f) between the oxide film thickness (direct controlled variable) and the emissivity power ratio produced from off-line measured data, theories, or approximation derived from theories, and a desired value conversion block 120 for obtaining the indirect desired value of the emissivity power ratio corresponding to the real control target (target of the oxide film thickness) for each radiation thermometer using the above correlation data.

In the emissivity power ratio calculation block 140, the difference between the measured value of the emissivity power ratio calculated according to the above relational expression (3A) and the desired value of the emissivity power ratio is calculated for each of the radiation thermometers 10a to 10e and the difference (error) between the measured value and the target value is input to a control device 150B. In the control device 150B, conversion (correction) of the control gain is performed in accordance with the above difference and the manipulated variable of the heater current for heating the continuous annealing furnace 12, the line speed, or the like is output therefrom.

In the correlation block 130, there are stored correlation functions f, which represent correlation graphs between the emissivity power ratio Ku and the oxide film thickness d as shown in FIG. 30 to FIG. 35 and from which the control target of the emissivity power ratio corresponding to the target of the oxide film thickness d (the direct desired value) at each measurement point for each of the radiation thermometers 10a to 10e can be obtained. Now, operation of the second embodiment will be described.

First, when the film thickness desired values $d_r(t)$ at the respective measurement points of the radiation thermometers 10a to 10e are input to the conversion block 120, the conversion block 120 outputs the real control targets $d_r(t)$ at the respective measurement points to the correlation block 130, and takes out from the conversion block 130 the indirect desired value of the emissivity power ratio $Ku^*(t)$ corresponding to the direct desired value.

Then, the conversion block 120 outputs the control target $Ku^*(t)$ to the block 150.

The block 150 takes in the measured value of emissivity power ratio according to the above expression (3A) for each of the radiation thermometers 10a to 10e and, then, compares the measured value $Ku^*$ with the control target $Ku$ of the emissivity power ratio input from the conversion block 130 and outputs the difference therebetween I to the control device 150B.

The control device 150B changes the control gain according to the difference (error) I and adjusts manipulated variable 170; the burner gas flow rate, the heater current, or the line speed to a suitable value.

FIG. 30 to FIG. 35 are graphs showing correlations between the emissivity power ratio Ku and the oxide film thickness d obtained by measurement made on the surface of steel plate with two two-color radiation thermometers arranged along a continuous annealing furnace (within the furnace) at intervals of a predetermined interval under different measurement conditions. At the top of FIG. 30, there is also shown the correlation between the emissivity $\epsilon$ and the oxide film thickness d.

Figure 30:
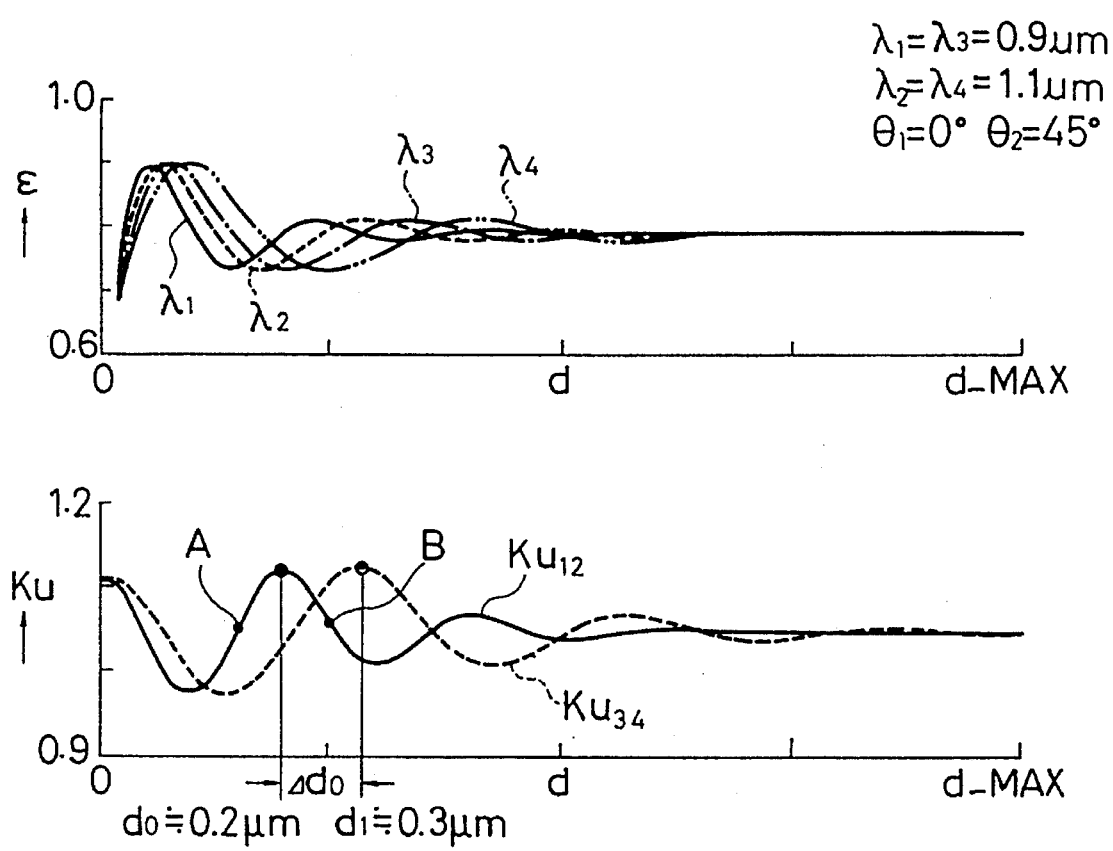
FIG. 30 is a diagram showing correlations of emissivity and emissivity power ratio with oxide film thickness.

In the correlation between the emissivity $\epsilon$ and the oxide film thickness d shown at the top of FIG. 30, the emissivities $\epsilon$ when the measurement wavelengths are $\lambda_1$, $\lambda_2$, $\lambda_3$, and $\lambda_4$ are indicated by solid line, broken line, one-dot chain line, and two-dot chain line, respectively, while in the graph at the bottom of FIG. 30 and the graphs in FIG. 31 to FIG. 35, the emissivity power ratios $\epsilon_2^{\lambda 2}/\epsilon_1^{\lambda 1}$ ($Ku_{12}$) obtained for the two wavelengths $\lambda_1$ and $\lambda_2$ according to the expression (3A) are denoted by solid line and the emissivity power ratios $\epsilon_4^{\lambda 4}/\epsilon_3^{\lambda 3}$ ($Ku_{34}$) equally obtained for the two wavelengths $\lambda_3$ and $\lambda_4$ are denoted by broken line.

Figure 36:
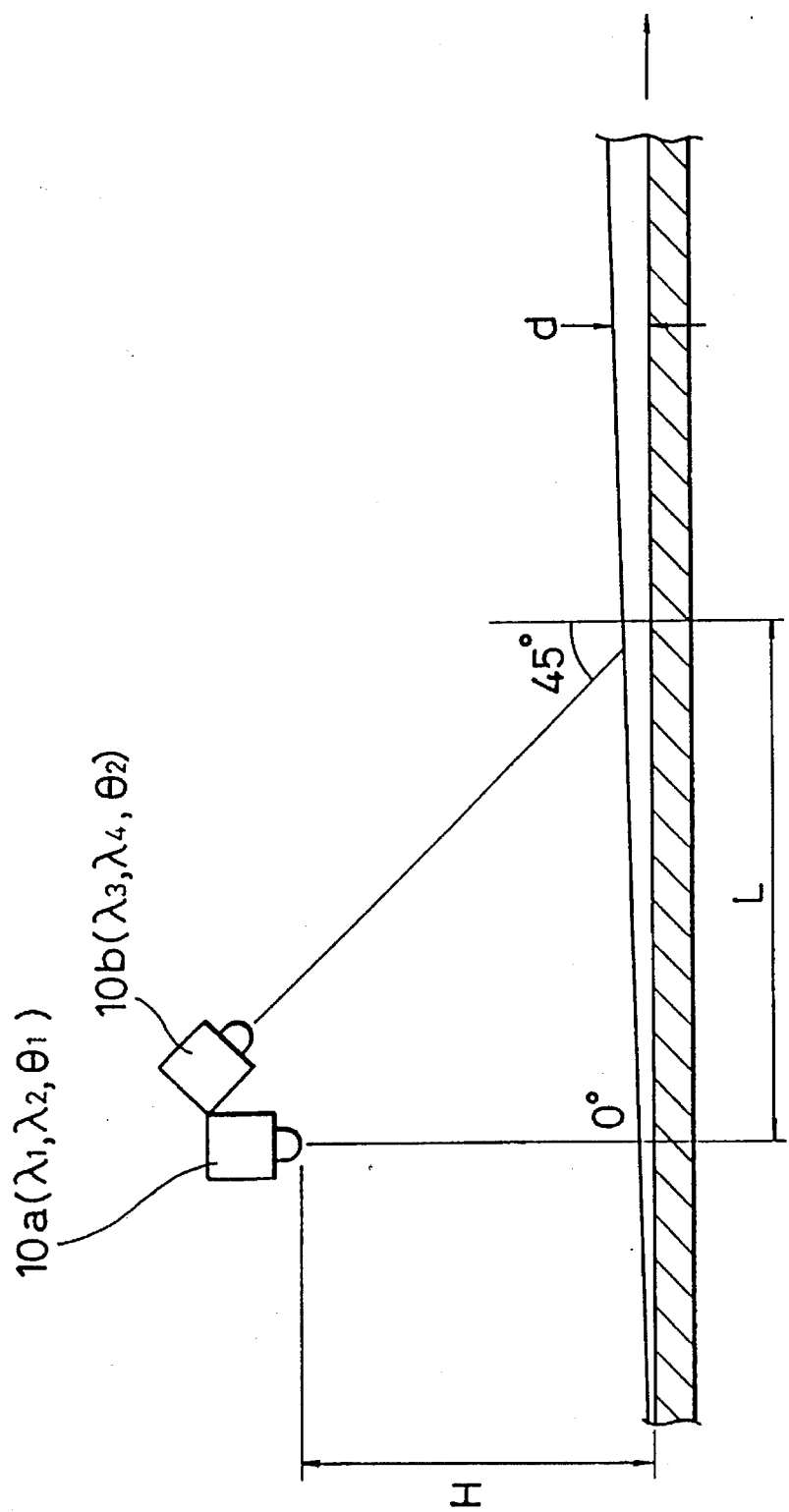
FIG. 36 is an explanatory diagram of an arrangement of radiation thermometers with respect to a processed material.

The graph shown in each figure is that obtained theoretically according to the following method with the arrangement, as shown in FIG. 36, having a first radiation thermometer 10a, of which measurement wavelengths are $\lambda_1$ and $\lambda_2$ and measurement angle is $\theta_1$, and a second radiation thermometer 10b, of which measurement wavelengths are $\lambda_3$ and $\lambda_4$ and measurement angle is $\theta_2$, disposed so as to have their respective measurement positions at a predetermined distance L. Incidentally, the oxide film thickness is exaggerated in FIG. 36.

We consider a case where an oxide film is formed on the surface of a material as shown in the schematic view in FIG. 37, i.e., carbon steel, a single layer of oxide film, and air are disposed from bottom up. First, complex indexes of refraction $n_1^*$, $n_2^*$, and $n_3^*$ for air (1), oxide film (2) and carbon steel (3), respectively, are obtained from the following expression (9), therein j=1, 2, 3, and i is imaginary unit.

$$n_j = n_j + i k_j \tag{9}$$

In the above expression (9), the real number portion n is normally called "index of refraction" and the imaginary number portion k is called "absorption coefficient". According to references, the complex indexes of refraction for air, oxide film, and carbon steel SPCC are given as follows:

$n_1^* = 1.0 + 0.0i$ $n_2^* = 2.5 + 0.65i$ $n_3^* = 2.0 + 2.1i$

Further, complex indexes of reflection $r^*$ at the interface between the air and the surface of oxide film (interface 12) and the interface between the oxide film and carbon steel (interface 23) both are given by the following Fresnel's formula (expression (10)).

$$r_{jk}^* = (n_j^* + n_k^*)/(n_j^* - n_k^*) \tag{10}$$

Between the complex indexes of reflection given by the above expression (10) and the oxide film thickness d, there are relations given by the following expressions (11) and (12).

$$r^* = \{r_{12}^* + r_{23}^* \cdot \exp(i\delta)\} \div \{1 + r_{12}^* \cdot r_{22}^* \cdot \exp(i\delta)\} \tag{11}$$

$$\delta = (4\pi/\lambda_i)(n_2^* d) \cos \theta_i \tag{12}$$

In opaque materials such as iron and steel, the transmittance is nearly (almost) zero and the emissivity is equal to the absorptivity according to Kirchhoff's low. Therefore, the emissivity $\epsilon$ can be calculated according to the following expressions (13) and (14).

$$\epsilon = 1 - R \tag{13}$$

$$R = |r^*|^2 \tag{14}$$

Calculation was made by applying the above complex indexes of refraction of air, oxide film, and carbon steel to the above calculation expressions and the results were obtained as expressed in graphs with the oxide film thickness d taken along the axis of abscissas and the emissivity power ratio Ku taken along the axis of ordinates as shown in FIGS. 30 to 35. As the parameters, the measurement wavelength: $\lambda$ and the measurement angle: $\theta$ were set, and the oxide film thickness d was set to be from 0 to 1.0 μm.

FIG. 30 is a graph obtained by measurement with the first radiation thermometer 10a placed under the measurement conditions of $\lambda_1 = 0.9$ μm, $\lambda_2 = 1.1$ μm, and $\theta_1 = 0$ and with the second radiation thermometer 10b placed under the measurement conditions of $\lambda_3 = 0.9$ μm, $\lambda_4 = 1.1$ μm, and $\theta_2 = 45°$. In this case, the first and second radiation thermometers 10a, 10b can be provided by silicon sensors.

In FIG. 30, the first maximal value (indicated by a ●) of the emissivity power ratio $Ku_{12}$ is located at approximately 0.2 μm of the oxide film thickness, while the first maximal value (indicated by a ○) of the emissivity power ratio $Ku_{34}$ is located at approximately 0.3 μm of the oxide film thickness, and the difference therebetween $\Delta d0$ is approximately 0.1 μm.

Therefore, if we consider that the point measured by the first radiation thermometer 10a moved a distance L until the point was measured by the second radiation thermometer 10b, the film thickness grew approximately 0.1 μm in the meantime. Process control can be executed utilizing this fact.

More specifically, if the increase in the film thickness $\Delta d0$ produced during the movement of the distance L corresponds to the increase in the direct desired value, the growth of the oxide film thickness can be directly and very accurately controlled by controlling the line speed or the furnace temperature so that the first radiation thermometer 10a monitoring the first maximal value indicated by the ● and the second radiation thermometer 10b monitoring the first maximal value indicated by the ○ may be able to measure the two maximal values.

If such a method as to have the first maximal values of the emissivity power ratios $Ku_{12}$ and $Ku_{34}$ obtained by such two radiation thermometers monitored, control for obtaining any desired film thickness can be achieved as shown in FIG. 31 to FIG. 35 by suitably changing the measurement conditions of the radiation thermometers, namely, the selected two wavelengths and measurement or polarization filtering angles θ and further, when necessary, the heights H of the setting of the radiation thermometers. Since the measurement angle θ is a solid angle and the surface of the steel plate is considered uniform, the radiation thermometer can be set in any desired angle with respect to the direction of the line flow.

Figure 31:
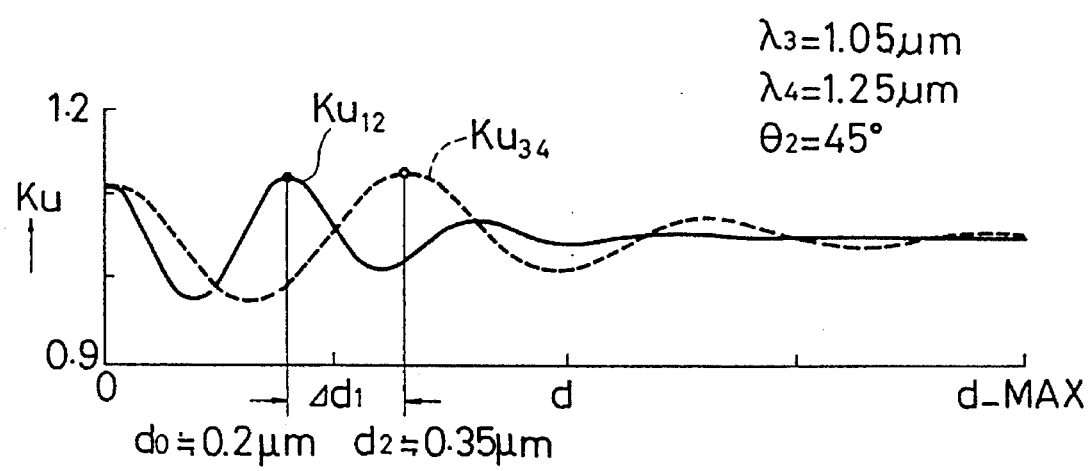
FIG. 31 is a diagram showing a correlation between emissivity power ratio and oxide film thickness.

Conditions in the case of FIG. 31 is the same as those in the case of FIG. 30 except that the measurement conditions of the second radiation thermometer 10b were set to measurement wavelengths $\lambda_3=1.05$ μm, $\lambda_4=1.25$ μm, and measurement angle $\theta_2=45°$. Also in this case, silicon sensors can be used for both of the radiation thermometers. For the second radiation thermometer 10b, the above wavelengths may be provided by arranging an optical filter to be switchable.

By increasing the measurement wavelengths of the second radiation thermometer 10b as described above, the first maximal value of the emissivity power ratio $Ku_{34}$ moves in the direction toward greater film thickness d(+) and, hence, the difference between the first maximal values $\Delta d1$ becomes approximately 0.15 μm, i.e., approximately 0.05 μm greater than that in the case of FIG. 30. Therefore, by using the correlation graph of FIG. 31, control to cause the oxide film thickness d to grow 0.15 μm in the movement of the distance L can be executed.

Figure 32:
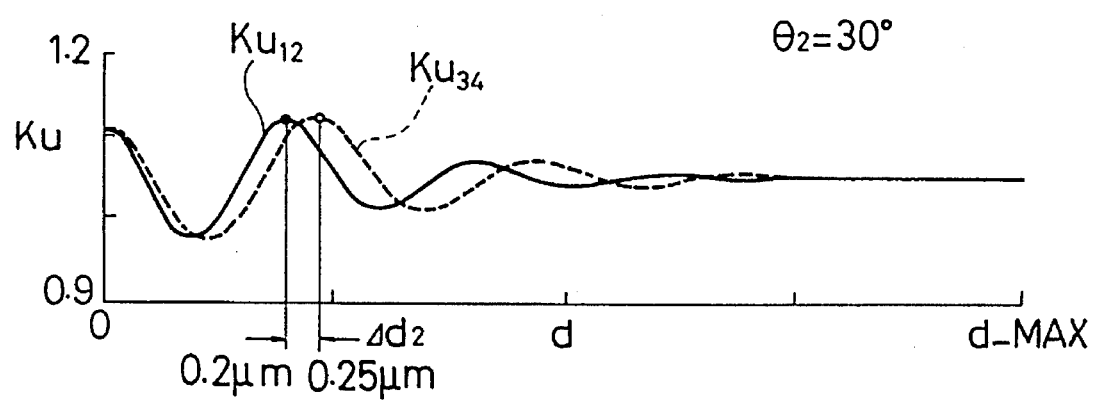
FIG. 32 is another diagram showing a correlation between emissivity power ratio and oxide film thickness.

Conditions in the case of FIG. 32 is the same as those in the case of FIG. 30 except that the measurement angle $\theta_2$ of the second radiation thermometer 10b was set 30°.

By decreasing the angle θ as above, the difference $\Delta d2$ between the first maximal values can be decreased to approximately 0.05 μm. Accordingly, the correlation graph of FIG. 32 can be utilized for fine control of the film thickness growth.

Figure 33:
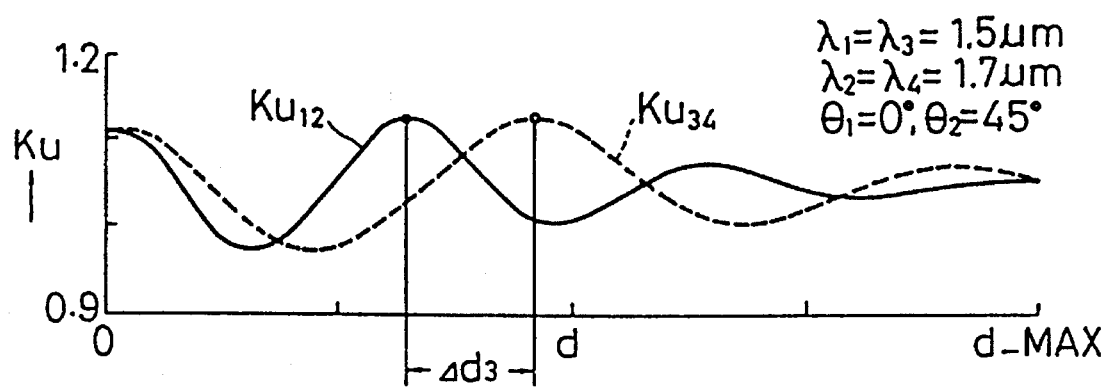
FIG. 33 is another diagram showing a correlation between emissivity power ratio and oxide film thickness.

FIG. 33 is a correlation graph obtained under the measurement conditions of $\lambda_1=\lambda_3=1.5$ μm, $\lambda_2=\lambda_4=1.7$ μm and the measurement angles $\theta_1=0$ and $\theta_2=45°$. In this case, germanium sensors can be used for the radiation thermometers.

In this case, the difference $\Delta d3$ between the first maximal values is shifted in the direction toward greater film thickness d(+) as compared with the case where silicon sensors are used.

Figure 34:
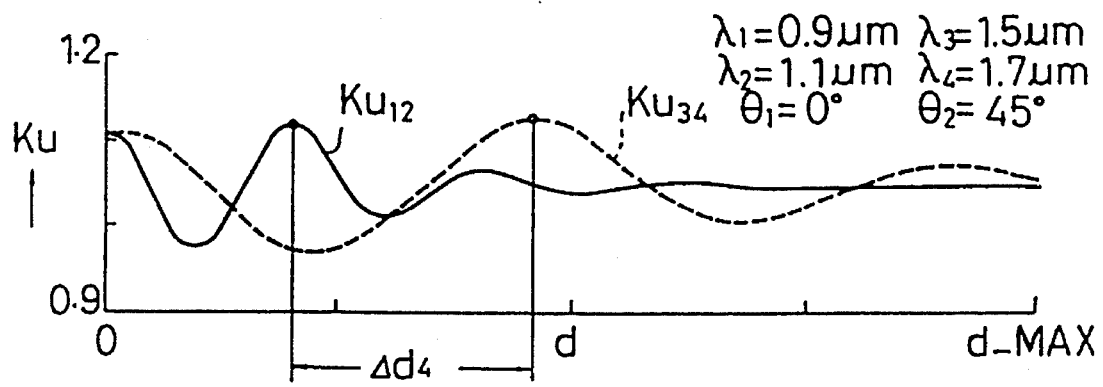
FIG. 34 is another diagram showing a correlation between emissivity power ratio and oxide film thickness.

FIG. 34 is a correlation graph obtained when measurement conditions for the first radiation thermometer 10a were $\lambda_1=0.9$ μm, $\lambda_2=1.1$ μm and $\theta_1=0$ and those for the second radiation thermometer 10b were $\lambda_3=1.5$ μm, $\lambda_4=1.7$ μm, and $\theta_2=45°$. In this case both a silicon sensor and a germanium sensor can be used. Further, in this case, the difference between the first maximal values $\Delta d4$ can be made still greater.

Figure 35:
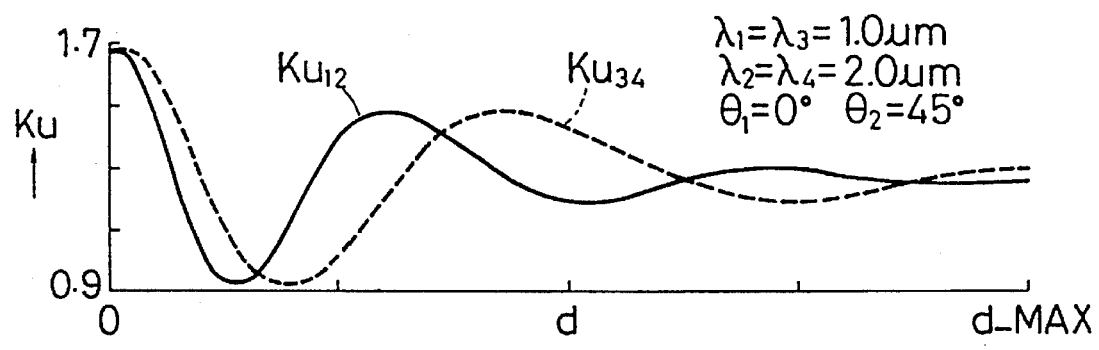
FIG. 35 is another diagram showing a correlation between emissivity power ratio and oxide film thickness.

FIG. 35 is a correlation graph obtained under the measurement conditions of $\lambda_1=\lambda_3=1.0$ μm, $\lambda_2=\lambda_4=2$ μm and the measurement angles $\theta_1=0$ and $\theta_2=45°$. In this case, both of the first maximal values are further shifted toward the side of longer wavelength.

Further, while disposing the first radiation thermometer 10a and the second radiation thermometer 10b at the same place, the two kinds of measurement functions can be given to the radiation thermometers.

For example, in order to cause the radiation thermometers to measure the two maximal values in FIG. 30 and those in FIG. 31, for example, optical filters for dispersing totally four wavelengths of (0.9 μm, 1.05 μm) and (1.0 μm, 1.25 μm) may be provided for the second radiation thermometer 10b so that measurement may be made for each of the two wavelengths.

By so arranging, selectively controlling one processed material to have a film thickness d1 and the other processed material to have a film thickness d2 can be achieved. By increasing the number of selectable wavelengths, process control of more kinds of products may be easily executed.

In the description given above, the cases where first maximal values appearing in correlation graphs are monitored were shown, it may be well even if another set of maximal values, or minimal values, are arranged to be monitored. It may also be well not to use such extreme values but to monitor intermediate points, Ku=1.0 for example, or to monitor the points of greatest gradient.

In the case where the first maximal values are monitored, it becomes possible to control the film thickness to attain the desired value by controlling the line speed or heating temperature so that the first maximal values corresponding to the desired values of all of the radiation thermometers can be measured at their respective measurement points. In such an arrangement, if a measurement value of the emissivity power ratio by one radiation thermometer has deviated from the first maximal value, the gradient ($\Delta Ku/\Delta d$) of the graph at that point may be calculated and it may be determined in which of the directions toward increasing d(+) and toward decreasing d(−) the maximal value is shifted according to the sign (±) of the gradient and how much the difference between the measurement value and indirect desired value is, and control may be executed to adjust a manipulated variable for example the line speed according to the difference (error).

In the case where the gradient, i.e., the differential coefficient ($\Delta Ku/\Delta d$) of the emissivity power ratio with respect to variation of the oxide film thickness (direct desired value) is monitored, it may be well to set the measurement wavelength and measurement angle so that the emissivity power ratio varies relatively greatly for a slight change in the oxide film thickness d in the vicinity of the value of the emissivity power ratio corresponding to the target of the oxide film thickness (direct desired value). For example, in the case indicated by the solid line of FIG. 30, the differential coefficient ($\Delta Ku/\Delta d$) becomes great in the vicinity of d=0.15 µm (point A) and d=0.25 µm (point B). Control at such a point provides a great variation in Ku for a change in d, whereby highly sensitive sensing is achieved and a good controlling effect is obtained. Further, since, in the above case, the signs of the differential coefficients (round Ku/round d) at the points where d is approximately 0.15 µm and d is approximately 0.25 µm are opposite, discrimination between control targets can also be achieved.

Figure 9:
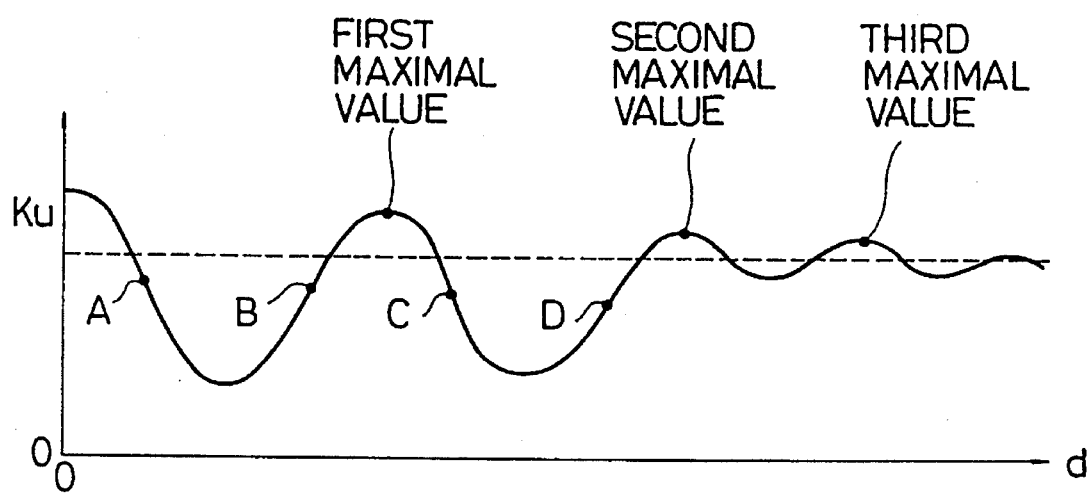
FIG. 9 is a diagram schematically showing a correlation between emissivity power ratio and oxide film thickness for explaining the principle of the present invention.
Figure 10:
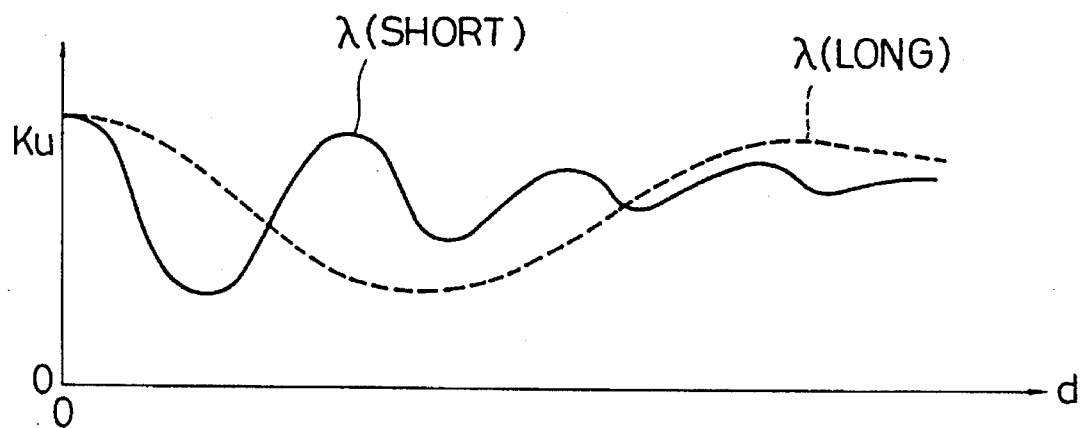
FIG. 10 is a diagram showing an effect of the wavelength produced on the correlation between emissivity power ratio and oxide film thickness.
Figure 11:
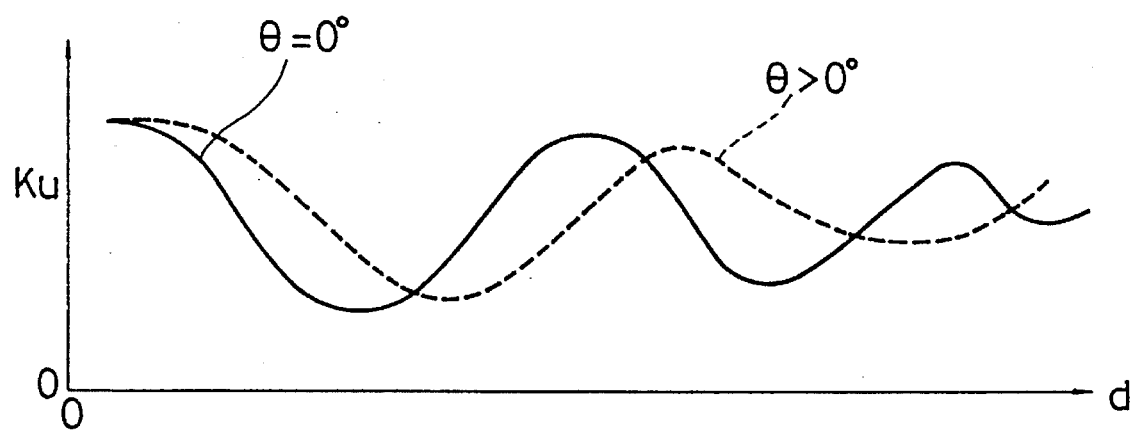
FIG. 11 is a diagram showing an effect of the measurement angle produced on the correlation between emissivity power ratio and oxide film thickness.

If the correlation between Ku and d is as shown in FIG. 9, the above method can be equally applied to points A to E. Incidentally, differential coefficients take up extreme values at the points A to E, their values are great and provide high sensitivity.

It is also possible to arrange, as shown in FIG. 38(A), a radiation thermometer 10a whose measurement wavelengths are $\lambda_1$ and $\lambda_2$ and measurement angle is $\theta_1$ and a radiation thermometer 10b whose measurement wavelengths are $\lambda_3$ and $\lambda_4$ and measurement angle is $\theta_2$ are disposed with a predetermined distance spaced apart above a material in process P in such relationships that the correlation between the emissivity power ratio and the film thickness d with the radiation thermometer 10a is as drawn by the broken line in FIG. 38(B) and that correlation with the radiation thermometer 10b is as drawn by the solid line therein. By disposing radiation thermometers at spaced apart positions as described above and controlling the radiation thermometers such that the emissivity power ratios derived by them are both maximal values, it becomes possible to control the film thickness to the desired film thickness $d_t(t)$ in the middle position.

Now, a third embodiment of the present invention will be described.

Figure 39A:
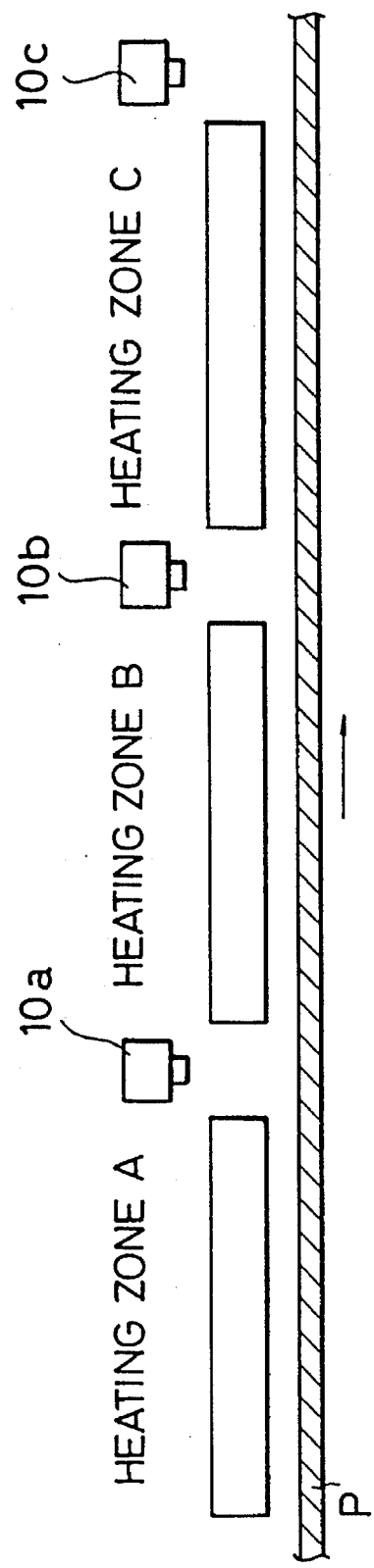
FIG. 39A is a side view explanatory diagram schematically showing an arrangement of radiation thermometers within an annealing furnace.
Figure 39B:
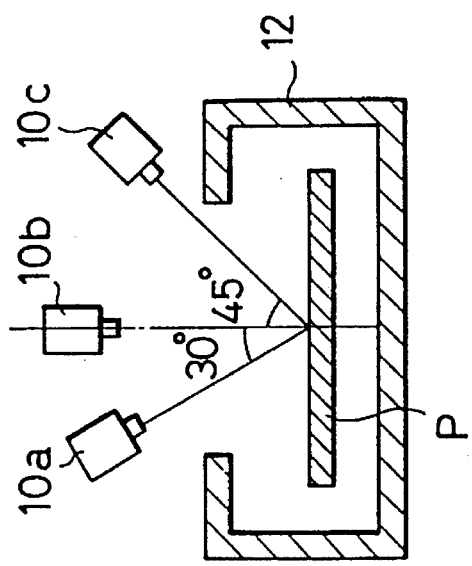
FIG. 39B is a front view explanatory diagram schematically showing an arrangement of radiation thermometers within an annealing furnace.
Figure 40:
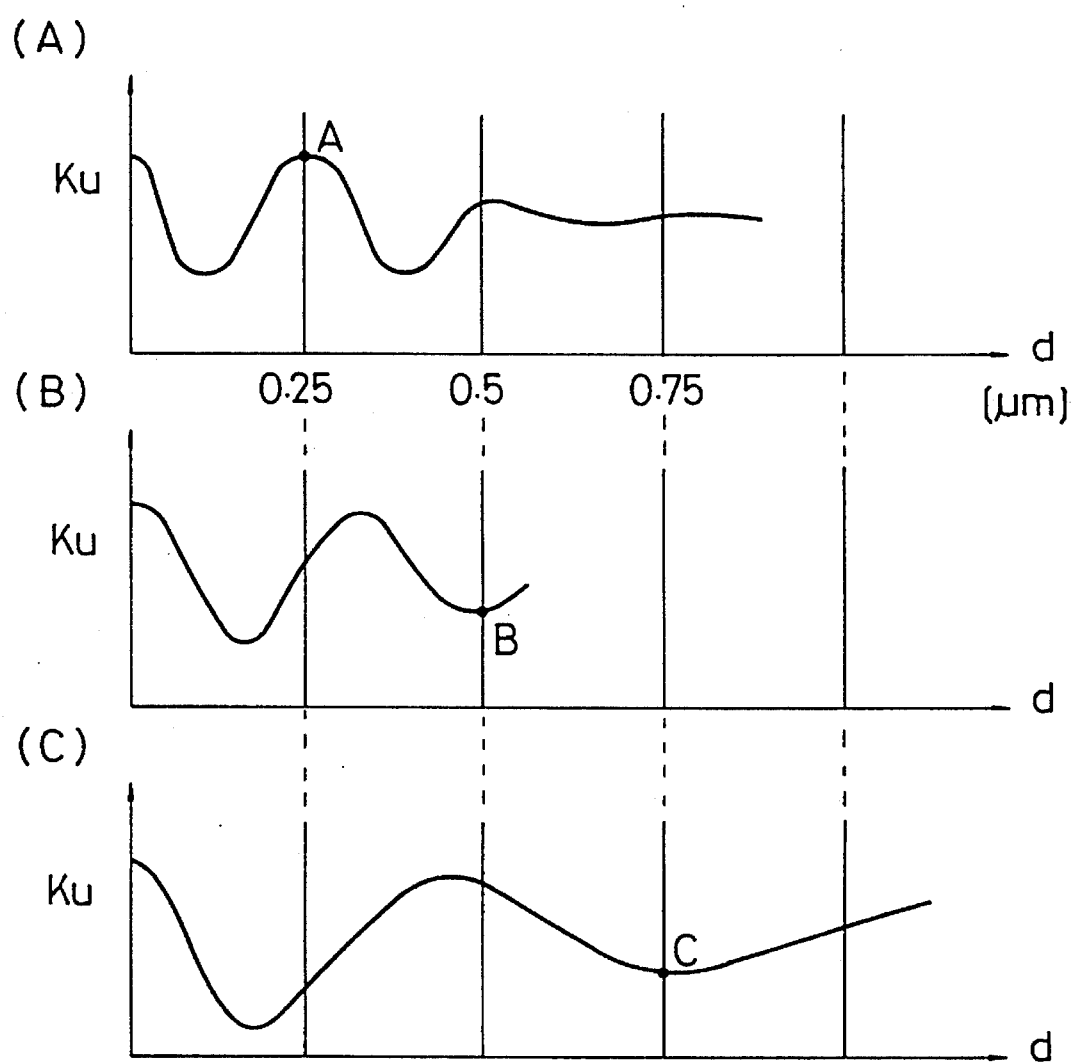
FIGS. 40(A), 40(B), and 40(C) are diagrams schematically showing correlations between emissivity power ratio measured by means of the radiation thermometers shown in FIG. 39 and film thickness.

This embodiment uses substantially the same apparatus as the apparatus used in the second embodiment and, as shown in the side view of FIG. 39A and the front view of FIG. 39B, has radiation thermometers 10a to 10c disposed between adjoining heating zones A to C, in which the radiation thermometers 10a to 10c are provided with functions to measure emissivity power ratio-film thickness characteristics as shown in FIGS. 40(A) to (C), respectively.

FIGS. 40(A) to (C) are graphs corresponding to the correlation curve for $Ku_{34}$ drawn by the broken line in FIG. 32, that for $Ku_{12}$ drawn by the solid line in FIG. 33, and that for $Ku_{34}$ drawn by the broken line in FIG. 35.

In the present embodiment, by having the radiation thermometers 10a, 10b, and 10c monitoring the first maximal value A (approximately 1.12) of FIG. 40(A), the second minimal value B (approximately 1.0) of FIG. 40(B), and the second minimal value C (approximately 1.2) of FIG. 40(C), respectively, and keeping the measurement status, it is made possible to control the oxide film thickness d to be approximately 0.25 µm, 0.5 µm, and 0.75 µm in the respective measurement positions of the radiation thermometers.

When the ratio Ku corresponding to a value d greater than the real control target d is measured by the radiation thermometer 10a, it is possible to control the film thickness to the right value by for example lowering the heating temperature at the heating zone A.

A fourth embodiment of the present invention will be described below.

This embodiment uses substantially the same apparatus as used in FIG. 28, except that radiation thermometers 10a to 10e all set to have the same measurement conditions are disposed as shown in FIG. 29.

Although a plurality of radiation thermometers having different measurement wavelengths or measurement angles were disposed in predetermined positions in the above described third and fourth embodiments, it is also possible to dispose radiation thermometers that are set to have the same measurement conditions.

By using a plurality of radiation thermometers with the same function as above and having the radiation thermometers monitoring the emissivity power ratio in a plurality of positions in the line, the tendency of growth of the oxide film thickness d can generally be recognized. This will be described below.

Figure 41:
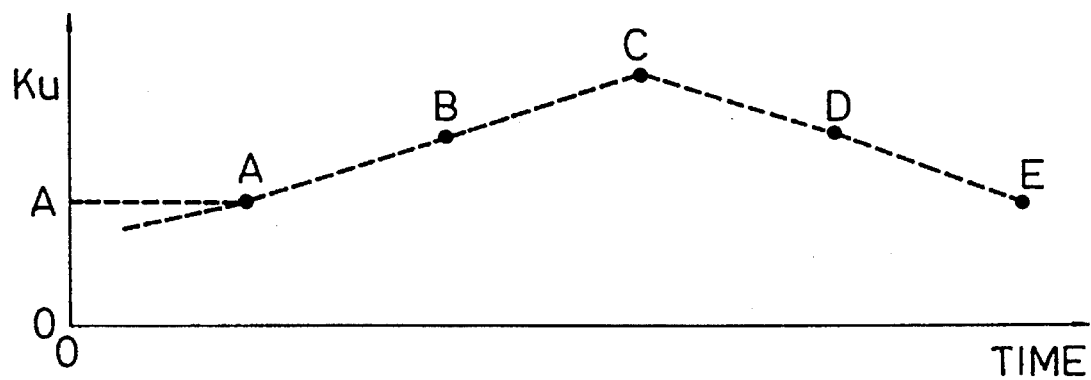
FIG. 41 is an explanatory diagram schematically showing values of emissivity power ratio measured by an arrangement of a plurality of radiation thermometers having the same setting of measurement conditions.

We assume that an emissivity power ratio-time graph as shown in FIG. 41 is obtained as the result of the monitoring by the five radiation thermometers 10a to 10e with the same measurement conditions ($\lambda_1$, $\lambda$, $\theta$) set therein and arranged as shown in FIG. 29. Points indicated by ● A to E in the graph indicates the values of emissivity power ratios monitored by radiation thermometers 10a to 10e, respectively.

Figure 42:
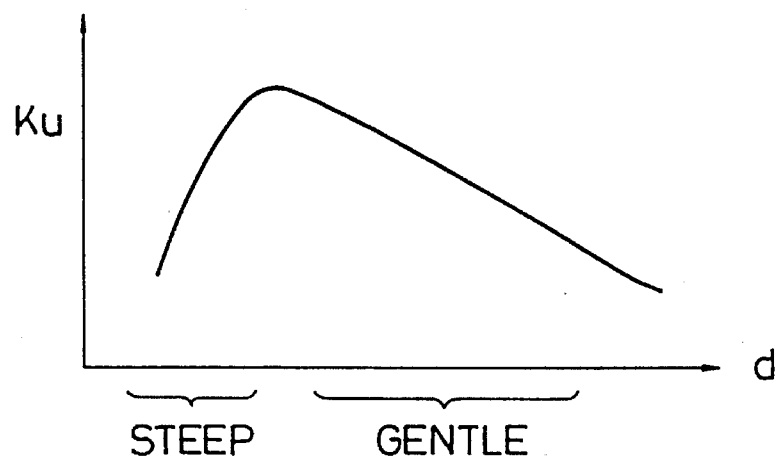
FIG. 42 is a diagram showing a relationship between the emissivity power ratio measured in FIG. 41 and the oxide film thickness.
Figure 43:
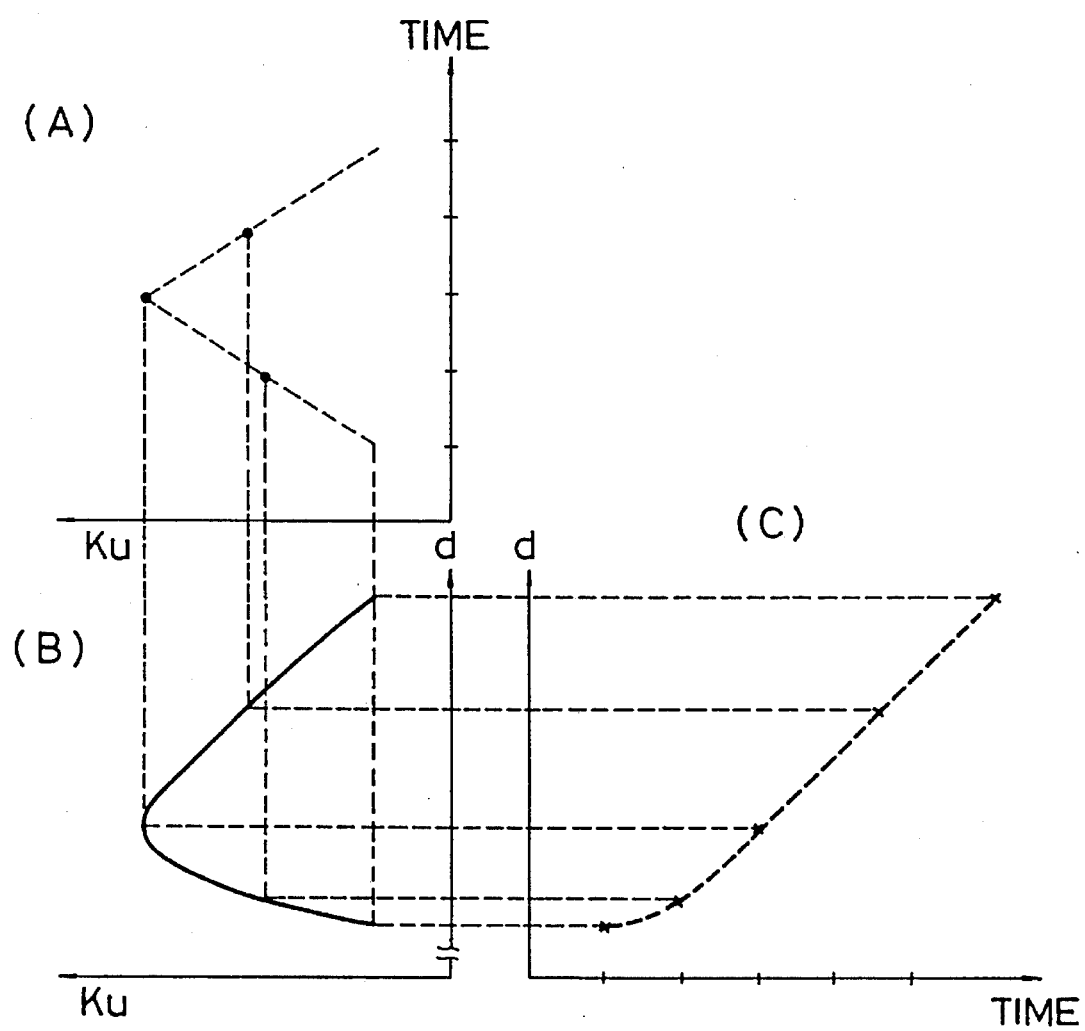
FIGS. 43(A)–43(C) show a relationship between the oxide film thickness and time derived from the relationships shown in FIG. 41 and FIG. 42.

While the data as shown in FIG. 41 are monitored, if for example the maximum value of the emissivity power ratio monitored by the radiation thermometer 10c is sufficiently close to the first maximal value and variation of the emissivity power ratio with respect to the oxide film thickness d around the first maximal value as shown in FIG. 42 is known, then on-line process information as shown in FIG. 43 can be obtained.

More specifically, from the on-line process time (which may be considered to be the measurement position because the line speed is constant), the data information as shown in FIG. 41 (FIG. 43(A)), and the emissivity power ratio reference information obtained off-line as shown in FIG. 42 (FIG. 43(B)), the relationship between the oxide film thickness d and the time as shown in FIG. 43(C) can be obtained.

Accordingly, the relationship between the on-line process time (position) and the film thickness, i.e., information how the film thickness varies with time on an on-line basis, can be obtained from FIGS. 43A–C.

It is known, in the case shown in FIGS. 43A–C, that the film thickness slowly increased from the radiation thermometer 10a to the radiation thermometer 10b and thereafter the film thickness increased relatively quickly. Thus, according to this embodiment, information on variation of the film thickness throughout the line can be recognized.

In the case where the measurement data as described above is obtained, if the continuous annealing furnace is divided into a heating zone A and a heating zone B for example as shown in FIG. 29 and it is desired to control the oxide film thickness d to increase more straightly (generally, it is not preferred to quickly increase the film thickness from the point of view of the quality of the product), such a control action to suppress the rate of increase of the oxide film thickness d can be suitably taken by lowering the temperature of the heating zone B. Further, the result of the control action can also be monitored.

Figure 44:
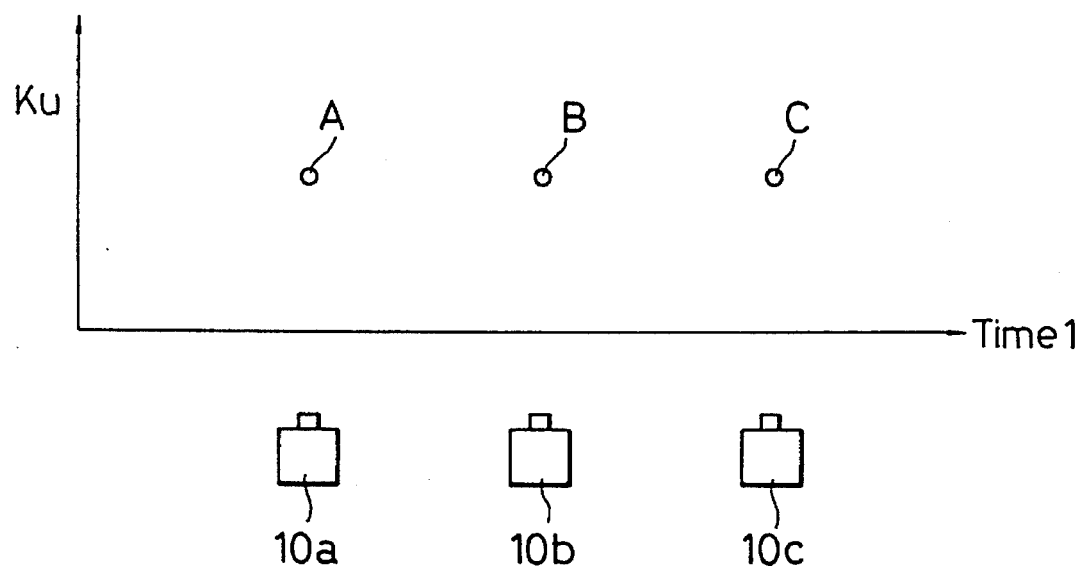
FIG. 44 is a diagram showing time variation of emissivity power ratio measured by radiation thermometers.
Figure 45:
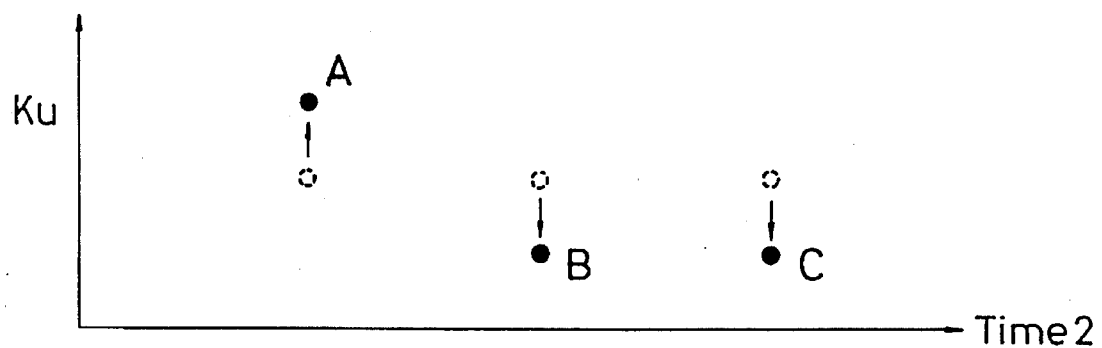
FIG. 45 is another diagram showing time variation of emissivity power ratio measured by radiation thermometers.

When a plurality of the same radiation thermometers are used, such information as shown in FIG. 44 and FIG. 45 can be obtained by changing the line speed and, further, a search for maximal value and minimal value of the emissivity power ratio can also be achieved. Instead of the line speed, the temperature of the heating furnace may be changed. However, changing the furnace temperature is slow in response and, hence, not practical.

More specifically, control is impossible when the emissivity power ratios A to C monitored by the radiation thermometers 10a to 10c are all virtually equal as shown in FIG. 44, but if the emissivity power ratio A monitored by the radiation thermometer 10a is raised while others B and C are lowered as shown in FIG. 45 for example by increasing the line speed, it is known that the maximal value is present on the side toward the radiation thermometer 10a. When the value of this emissivity power ratio is raised to the vicinity of the first maximal value, it is known that the oxide film thickness corresponding to the first maximal value is already present on the side toward the radiation thermometer 10a.

Figure 46:
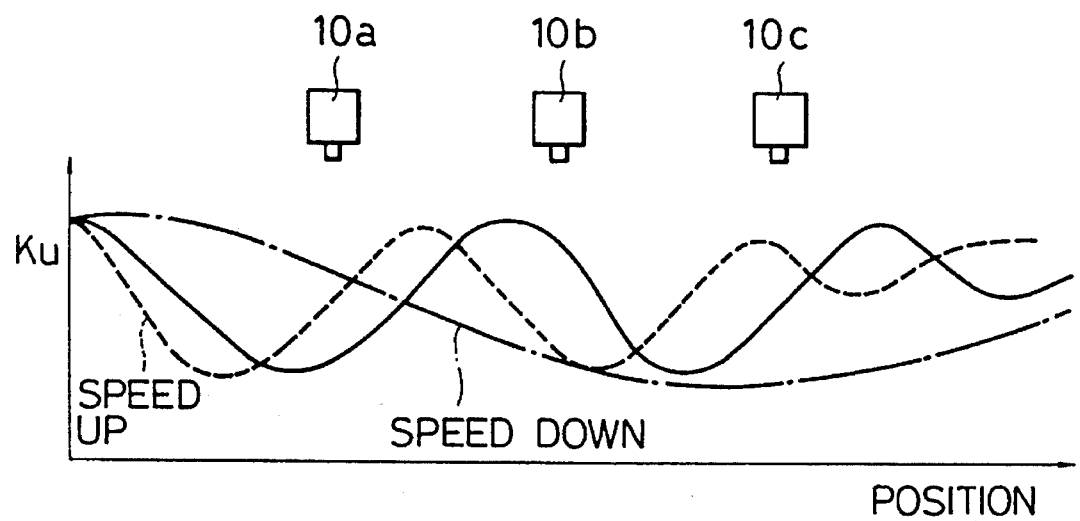
FIG. 46 is a diagram showing variations of emissivity power ratio produced by changes in line speed.

Generally, the emissivity power ratio-oxide film thickness d correlation graph is contracted (broken line in FIG. 46) toward the side of the origin when the line speed is increased and it is, conversely, expanded (one dot chain line in FIG. 46) when the line speed is decreased as shown in FIG. 46.

Figure 47:
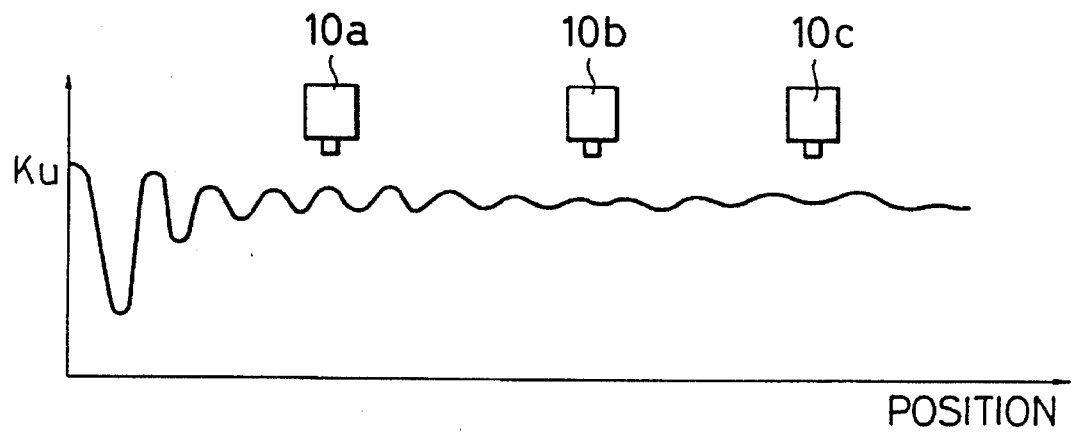
FIG. 47 is a diagram for explaining prevention of erroneous measurement of an extreme value of emissivity power ratio.

By utilizing the above characteristic, it becomes possible to make a search for a maximal value (or minimal value) and a mistake in control due to existence of more than one of extreme values between two thermometers as shown in FIG. 47 can be prevented. In the case of FIG. 47, since the radiation thermometer 10a in FIG. 47 is monitoring the emissivity power ratio at a portion past the first maximal value, erroneous control is made when control is executed by monitoring the first maximal value.

The search for an extreme value by changing the line speed as described above can be performed at the time for example when the line speed is decreased to connect the materials in a continuous line or when processing conditions are to be changed and the processing conditions for the following material are set up in advance by a sacrifice of the processing of the preceding material.

When radiation thermometers with the same measurement conditions set up therein are used, the oxide film thickness d can also be controlled in the following manner.

Figure 48:
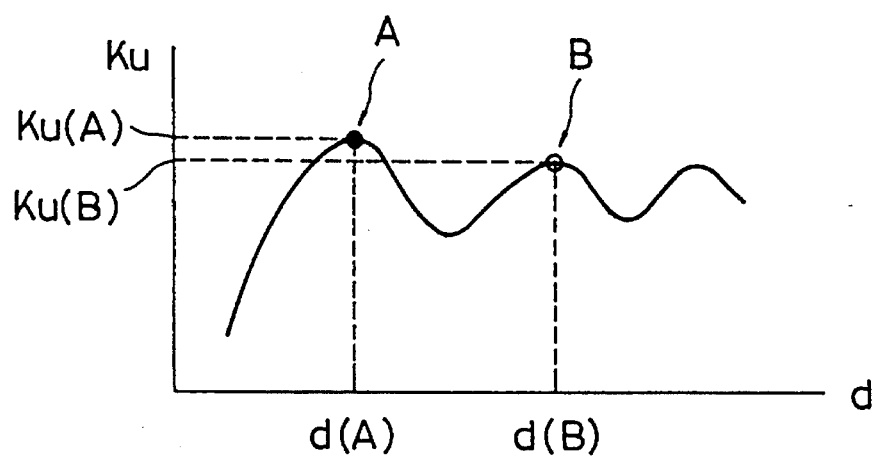
FIG. 48 is a diagram schematically showing a correlation between emissivity power ratio and oxide film thickness.
Figure 49:
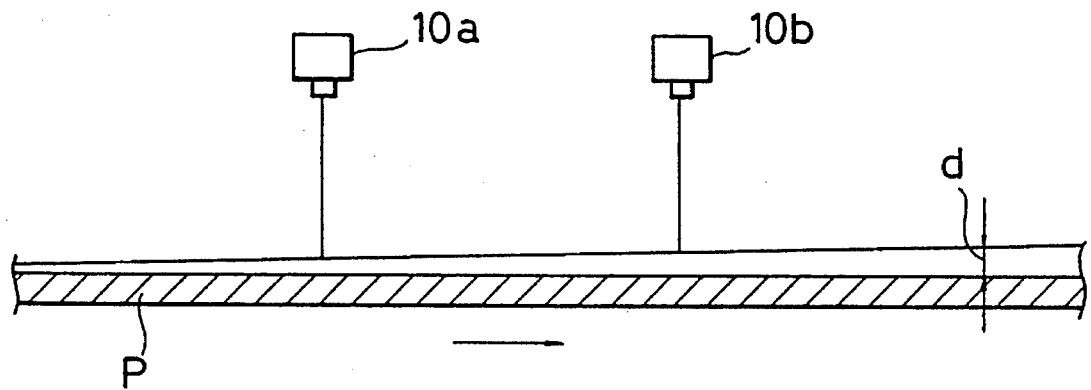
FIG. 49 is an explanatory diagram schematically showing an arrangement of radiation thermometers having the same setting of measurement conditions.

When there is a correlation as shown in FIG. 48 between the emissivity power ratio Ku and the oxide film thickness d, two radiation thermometers 10a and 10b with the same setting of measurement conditions may be disposed at a predetermined distance as shown in FIG. 49 with the material in process P moving toward the right of the drawing at a constant line speed such that the radiation thermometer 10a monitors the first maximal value A and the radiation thermometer 10b monitors the second maximal value B, respectively.

By so arranging, when it is desired to control the oxide film thickness d so that d(A)<d<d(B) is attained in the middle of the process line, control to obtain the oxide film thickness substantially at the desired value can be executed by having the values of the emissivity power ratios Ku(a) and Ku(b) obtainable from the outputs of the radiation thermometers 10a and 10b monitored in advance and controlling the line speed or the heating temperature of the heating furnace such that Ku(a) and Ku(b) virtually concur with Ku(A) and Ku(B), respectively.

Although the present invention has so far been described with a certain degree of particularity, the present invention is not limited to the above described embodiments but various changes can be made without departing from the spirit of the invention.

For example, though the cases where a correlation between the emissivity power ratio and the oxide film thickness d is theoretically obtained have been described, the way for obtaining the correlation is not limited to that. It may be obtained on the basis of measured data in experiments or on the basis of approximation derived from theoretical expressions.

Although only the oxide film thickness d has been mentioned as the real controlled variable, the present invention is applicable to other thin films such as a nitride film.

Further, the real controlled amount may be physical properties such as the degree of surface galvannealing. The present invention can be equally applied for example to the degree of galvannealing on galvanized sheet steel or another surface physical property provided that it has a correlation with the emissivity power ratio.

Figure 50:
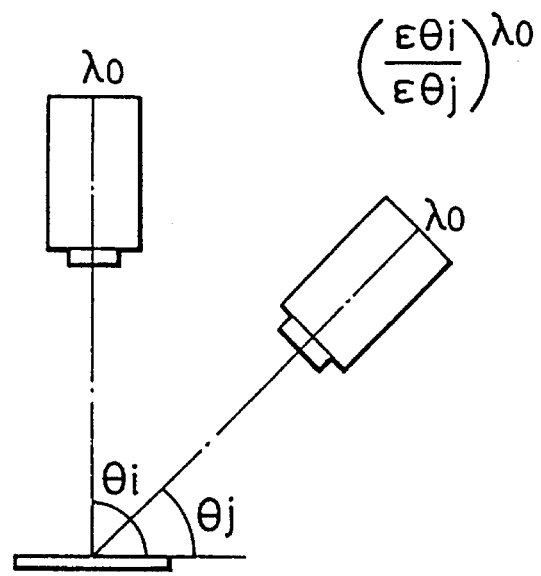
FIG. 50 is an explanatory diagram schematically showing a modified example of radiation thermometers.
Figure 51:
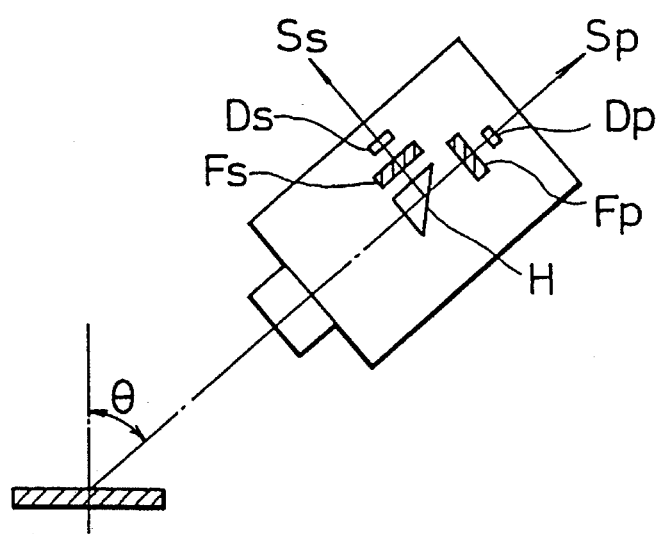
FIG. 51 is an explanatory diagram schematically showing another modified example of radiation thermometers.

And further, though a pair of different wavelengths $\lambda_i$, $\lambda_j$ ($i \neq j$) are used for simplicity in the above explanation of the invention, for the calculation of emissivity power ratio a pair of different measurement angles $[\theta_i, \theta_j (i \neq j)]$ as shown in FIG. 50 or different polarization filtering angles $[\theta_p, \theta_s$ for example] as shown in FIG. 51, can be used.

Here, $\theta_p$ is P-wave filtering of radiation energy of the material, $\theta_s$ is S-wave filtering of radiation energy of the material.

In FIG. 51, H is a half mirror or a beam splitter, Fp or Fs is a polarization filter for P-wave or S-wave, respectively, Dp or Ds is a detector for P-wave or S-wave, respectively, and Sp or Ss is a detection signal (brightness temperature) of P-wave or S-wave, respectively.

As described above, even if, wavelengths $\lambda_i$, $\lambda_j$ are the same ($\lambda_i = \lambda_j = \lambda_0$), this invention is applicable.

In the above mentioned case ($\lambda_i = \lambda_j = \lambda_0$), the emissivity power ratio is $(\epsilon_i / \epsilon_j)^{\lambda_0}$, and the formula of calculation of that is shown below.

$$(\epsilon_i/\epsilon_j)^{\lambda_0} = \exp\{C_2(1/S_j - 1/S_i)\}$$

This is the special case of emissivity power ratio using the same wavelength $\lambda_0$. $\epsilon_i$ is emissivity for measurement angle or polarization filtering angle $\theta_i$. $\epsilon_j$ is emissivity for measurement angle or polarization filtering angle $\theta_j$.

What is claimed is:

1. A method for controlling a high temperature process, the high temperature process having a heated material emit radiation energy, the method comprising the steps of:

detecting simultaneously said radiation energy under one of the following conditions: at a plurality of different wavelengths, at a plurality of different measurement angles, or at a plurality of different polarization filtering angles;

obtaining at least one measured emissivity power ratio from the detected radiation energy, each measured emissivity power ratio being derived from radiation energy detected under said one of said conditions at two of said plurality of different wavelengths, measurement angles, or polarization filtering angles, the measured emissivity power ratio expressed as:

emissivity power ratio=$\exp\{C_2(1/S_2 - 1/S_1)\}$ where:
   $S_1$=a first measurement of detected radiation under said one condition,
   $S_2$=a second measurement of detected radiation under said one condition;
   $C_2$=Planck's second radiation constant;

converting desired value of control into an indirect desired emissivity power ratio; and automatically controlling the high temperature process of said heated material using said indirect desired emissivity power ratio as a target and said at least one measured emissivity power ratio as an at least one controlled variable.

2. The method of claim 1, wherein said converting step comprises converting a plurality of desired values of control from an initial value to a final value to a corresponding plurality of indirect desired emissivity power ratios, and said automatic controlling step comprises using said plurality of indirect desired emissivity power ratios as targets.

3. The method of claim 1, wherein said obtaining step comprises obtaining a plurality of measured emissivity power ratios from said detected radiation energy, and said automatic controlling step comprises using a plurality of indirect desired emissivity power ratios as targets and said plurality of measured emissivity power ratios as controlled variables.

4. The method of claim 1, wherein said detecting step comprises detecting said detected radiation energy at least at three different wavelengths or angles, said obtaining step comprises obtaining a plurality of measured emissivity power ratios from said detected radiation energy, and said automatic controlling step comprises using each of said measured emissivity power ratios as a controlled variable.

5. An apparatus for controlling a high temperature process, the high temperature process having a heated material emit radiation energy, the apparatus comprising:

a desired value conversion means for determining an indirect desired emissivity power ratio using a known relationship between a desired value of control and a corresponding emissivity power ratio;

at least one radiation sensor, each sensor detecting simultaneously said radiation energy under one of the following conditions: at a plurality of different wavelengths, at a plurality of different measurement angles, or at a plurality of different polarization filtering angles, and outputting the detected radiation energy as a corresponding radiation energy signal; and an emissivity power ratio calculation means for obtaining at least one measured emissivity power ratio from said radiation energy signals, each measured emissivity power ratio being derived from radiation energy detected under said one of said conditions at two of said plurality of different wavelengths, measurement angles, or polarization filtering angles, the measured emissivity power ratio expressed as:

emissivity power ratio=exp $\{C_2(1/S_2 - 1/S_1)\}$ where:

$S_1$=a first measurement of detected radiation under said one of said conditions, $S_2$=a second measurement of detected radiation under said one of said conditions, $C_2$=Planck's second radiation constant;

an automatic control means for processing said heated material using said indirect desired emissivity power ratio as a target and using said at least one measured emissivity power ratio as an at least one controlled variable.

6. The apparatus of claim 5, wherein said desired value conversion means includes means for providing a plurality of said indirect desired emissivity power ratios, and said automatic controlling means automatically controls the high temperature process based on said indirect desired emissivity power ratios.

7. The apparatus of claim 6, wherein a differential coefficient of the measured emissivity power ratio with respect to a variation of the desired value of control becomes great in a vicinity of the indirect desired emissivity power ratio.

8. The apparatus of claim 5, wherein said emissivity power ratio calculation means includes means for obtaining a plurality of measured emissivity power ratios from said detected radiation energy for the plurality of wavelengths or angles and for comparing the measured emissivity power ratios with the indirect desired emissivity power ratio to automatically control the high temperature process.

9. The apparatus of claim 5, wherein said indirect desired emissivity power ratio is an extreme value of a plurality of indirect emissivity power ratios corresponding to values of control in the vicinity of the desired value of control.

10. An apparatus for controlling a high temperature process, the high temperature process having a heated material emit radiation energy, the apparatus comprising:

a plurality of radiation thermometers positioned along a continuous high temperature process line continuously processing said heated material;

emissivity power ratio calculation means for calculating a measured emissivity power ratio for each radiation thermometer using radiation energy measured simultaneously by each radiation thermometer under one of the following conditions: at a plurality of different wavelengths, at a plurality of different measurement angles, or at a plurality of different polarization filtering angles, each calculated emissivity power ratio being derived from radiation energy measured under said one of said conditions at two of said plurality of different wavelengths, measurement angles, or polarization filtering angles, the measured emissivity power ratio expressed as:

emissivity power ratio=exp $\{C_2(1/S_2 - 1/S_1)\}$ where:

$S_1$=a first measurement of measured radiation under said one of said conditions, $S_2$=a second measurement of measured radiation under said one of said conditions, $C_2$=Planck's second radiation constant;

data storage means for storing correlation data between a desired value of control and a corresponding emissivity power ratio determined off-line;

desired value conversion means using said correlation data for obtaining an indirect desired emissivity power ratio for each of said radiation thermometers;

error calculation means for calculating an error between the measured emissivity power ratio and the indirect emissivity power ratio for each of said radiation thermometers;

control means for correcting a manipulated variable based on a measured error between the measured emissivity power ratio and the indirect desired emissivity power ratio for each radiation thermometer and for outputting the corrected manipulated variable for controlling the high temperature process.

11. The apparatus of claim 10, wherein each radiation thermometer measures a same measurement point of said heated material at a different measurement position along the high temperature process line.

12. The apparatus of claim 10, wherein each radiation thermometer uses a plurality of measurement wavelengths, measurement angles or polarization filtering angles which are selected based on an emissivity power ratio corresponding to a desired value of control of the heated material at the measurement position.

13. The apparatus of claim 10, wherein said desired value conversion means includes means for outputting a plurality of indirect desired emissivity power ratios to automatically control the high temperature process.

* * * * *